US007225121B2

(12) United States Patent
Maxwell, III et al.

(10) Patent No.: US 7,225,121 B2
(45) Date of Patent: May 29, 2007

(54) GENERATING WITH LEXICAL FUNCTIONAL GRAMMARS

(75) Inventors: John T. Maxwell, III, Cupertino, CA (US); Hadar Shemtov, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 945 days.

(21) Appl. No.: 10/260,652

(22) Filed: Sep. 27, 2002

(65) Prior Publication Data

US 2003/0163301 A1 Aug. 28, 2003

Related U.S. Application Data

(60) Provisional application No. 60/359,176, filed on Feb. 20, 2002.

(51) Int. Cl.
*G06F 17/27* (2006.01)
*G06F 15/00* (2006.01)

(52) U.S. Cl. .......................................... 704/9; 715/514

(58) Field of Classification Search .................... 704/9; 715/514

See application file for complete search history.

(56) References Cited

U.S. PATENT DOCUMENTS 5,475,587 A * 12/1995 Anick et al. .................. 704/9
5,727,222 A * 3/1998 Maxwell, III .................. 704/9
5,731,814 A * 3/1998 Bala ........................... 715/848
5,819,210 A * 10/1998 Maxwell et al. ............... 704/9
5,903,860 A * 5/1999 Maxwell et al. ............... 704/9
5,926,784 A * 7/1999 Richardson et al. ........... 704/9
5,999,896 A * 12/1999 Richardson et al. ........... 704/9
5,999,917 A * 12/1999 Facciani et al. .......... 705/36 R
6,128,596 A * 10/2000 Mackie ....................... 704/257
6,138,087 A * 10/2000 Budzinski ...................... 704/9
6,745,151 B2 * 6/2004 Marko et al. ............... 702/182
6,785,643 B2 * 8/2004 Hayosh et al. ................. 704/9
2003/0018469 A1 * 1/2003 Humphreys et al. ........... 704/9

OTHER PUBLICATIONS

Brew, C. (1992) "Letting the cat out of the bag: generation for Shake-andBake MT". In proceedings of the 14th International Conference on Computational Linguistics, pp. 610-616.

Calder, J et al. (1989) "An algorithm for generation in Unification Categorial Grammar". In Proceedings of the 4th Conference of the European Chapter of the Association for Computational Linguistics, pp. 233-240, Manchester, 1989.

(Continued)

*Primary Examiner*—Tālivaldis Ivars Šmits
*Assistant Examiner*—Myriam Pierre
(74) *Attorney, Agent, or Firm*—Christian Austin-Hollands

(57) ABSTRACT

A process for generating with unification based grammars such as Lexical Functional Grammars which uses construction and analysis of generation guides to determine internal facts and eliminate incomplete edges prior to constructing a generation chart. The generation guide can then be used in the construction of the generation chart to efficiently generate with unification-based grammars such as Lexical Functional Grammars. The generation guide is an instance of a grammar that has been specialized to the input and only contains those parts of the grammar that are relevant to the input. When the generation guide is analyzed to determine internal facts a smaller generation chart is produced.

41 Claims, 18 Drawing Sheets

OTHER PUBLICATIONS

Shieber, S. M. et al. (1989) "A semantic-head-driven generation algorithm for unification based formalisms". In 27th Annual Meeting of the Association for Computational Linguistics, pp. 7-17, Vancouver, 1989.

Trujillo, A. (1997) "Determining internal and external indices for chart generation". In Proc. of the 7th International Conference on Theoretical and Methodological Issues in Machine Translation (TMI-97).

Kay, M. (1996) "Chart generation" In 34th Annual Meeting of the Association for Computational Linguistics, pp. 200-204, Santa Cruz.

Carroll. J. et al. (1999) "An Efficient Chart Generator for (Semi-)Lexicalist Grammars". Proceedings of the 7th European Workshop on Natural Language Generation (EWNLG'99), Toulouse, pp. 86-95.

Neumann, G. (1997) "Applying explanation-based learning to control and speeding-up natural language generation". In 35th Annual Meeting of the Association for Computational Linguistics/8th Conference of the European Chapter of the Association for Computational Linguistics, Madrid, Spain, 1997.

Langkilde, I. (2000) "Forest-based statistical sentence generation". In 6th Applied Natual Language Processing Conference (ANLP'2000), pp. 170-177, Seattle.

Shemtov, H. (1998), "A Method for Preserving Ambiguities in Chart Generation". Proceedings of the 1st Workshop on Tabulation in Parsing and Deduction, TAPD'98, Paris, France, Apr. 2-3, 1998, pp. 36-43.

Shemtov, H. (1997) "Ambiguity Management in Natural Language Generation". Ph.D. Thesis, Stanford University, Jun. 1997.

Shemtov, H. (1996) "Generation of Paraphrases from Ambiguous Logical Forms". In Proceedings of the 16th International Conference on Computational Linguistics (COLING), pp. 919-924, Copenhagen, Denmark, Europe.

Co-Pending U.S. Patent Application "Generating with Lexical Functional Grammars" Maxwell III filed Sep. 27, 2002.

Lappin et al., Anaphora Resolution in Slot Grammar, Dec. 1990, Computational Linguistics, vol. 16, No. 4, pp. 197-212.

* cited by examiner

GENERATING WITH LEXICAL FUNCTIONAL GRAMMARS

CROSS REFERENCE TO RELATED APPLICATIONS

This patent application claims priority benefit from U.S. Provisional Application No. 60/359,176 filed Feb. 20, 2002.

BACKGROUND

This invention relates generally to a computational linguistics, and more specifically provides an algorithm for generating with Lexical Functional Grammars which uses construction and analysis of generation guides to determine internal facts and eliminate incomplete edges prior to constructing a generation chart.

One of the major concerns of computational linguistics is relating strings of words to abstract representations of meanings given a grammar of a particular language. The process of going from a string of words to an abstract representation of meaning is called "parsing". The process of going from an abstract representation of meaning to a string of words is called "generation". Parsing is useful for information retrieval, text understanding, dialog management, and translation. Generation is useful for dialog management, user interface output, and translation.

In the literature, generation has two different meanings. Generation can mean the process of figuring out what to say. This is sometimes called "planning". We will refer to this herein as planning generation. Generation can also mean the process of figuring out how to say something, given that you know what to say. This is sometimes called "realization" or "tactical generation". Although the latter seems easy by comparison with the former, it can be tricky to implement efficiently. This patent application is about a means for doing tactical generation. When we use the term generation in the rest of the patent application, we will always mean tactical generation.

Both parsing and generation assumes a grammar of some sort. In our terminology, a grammar is a declarative representation of the relationship between strings of words and their meanings. We are particularly interested in Lexical Functional Grammars, which provide a very expressive notation for describing languages. Lexical Functional Grammars (LFGs) are made up of phrase structure rules that are annotated with feature structure constraints. For instance, here is an LFG rule:

S→NP: (∧ SUBJ)=!; VP: ∧=!.

This says that an S (a sentence) is made up of an NP (a noun phrase) and a VP (a verb phrase). Furthermore, the feature structure constraint "(∧ SUBJ)=!" indicates that the feature structure associated with the NP (denoted by "!") is the SUBJ (the subject) of the feature structure associated with the S (denoted by "∧"). Also, the constraint "∧=!" indicates that the feature structure associated with the VP (denoted by "!") is the same as the feature structure associated with the S (denoted by "∧"). The symbols "∧" and "!" are called meta-variables and they can be instantiated to different feature structures with each application of this rule.

Lexical Functional Grammars also have lexical entries which associate categories and feature structure constraints with particular words. For instance, we might have the following lexical entries:

John NP (∧ PRED)='John'.

slept VP (∧ PRED)='sleep<(∧ SUBJ)>'

(∧ TENSE)=past.

The first entry says that "John" can be an NP with the constraint (∧ PRED)='John'. This constraint says that the PRED (the predicate) of the feature structure associated with "John" is 'John'. The single quotes around John indicate that it semantic, a predicate with no arguments that denotes the person named "John". Similarly, "slept" can be a VP with the constraints (∧ PRED)='sleep<(∧ SUBJ)>' and (∧ TENSE)=PAST. The first constraint says that the feature structure associated with "slept" has a predicate named 'sleep' that takes one argument, which is the SUBJ (the subject) of the feature structure associated with "slept". The second indicates that "slept" is a past tense verb.

If we use this information to parse the sentence "John slept", we learn that "John" is an NP and "slept" is a VP, and that the NP and the VP can combine into an S. Furthermore, the constraints for "John" are instantiated to (f1 PRED) ='John' and the constraints for "slept" are instantiated to (f2 PRED)='sleep<(f2 SUBJ)' and (f2 TENSE)=PAST, where f1 and f2 are new feature structure variables. Using the constraints on the S rule, we learn that (f2 SUBJ) is equal to f1. Thus we end up with the following constraints for "John slept":

(f2 PRED)='sleep<f1>' (f2 TENSE)=PAST (f2 SUBJ)=f1

(f1 PRED)='John'

These constraints describe a feature structure that gives an abstract representation of the meaning of "John slept". In particular, it gives the predicate-argument structure and the tense for the sentence. Using the same grammatical information, we can generate from these constraints. We start by noting that the ∧in the S rule must match f2. The constraint (∧ SUBJ)=! says that the feature structure associated with the NP (e.g. !) is the SUBJ of the feature structure associated with the S. Using the input constraints, we see that the ! must match f1. We then look in the lexical entries of the grammar for an NP that has constraints that match (f1 PRED)='John'. This gives us "John". Similarly, the VP constraint ∧=! tells us that the feature structure for the VP must be f2. We then look in the lexical entries for a VP whose constraints are consistent with (f2 PRED)='sleep<f1>' and (f2 TENSE) =PAST. This gives us "slept". We are now done generating the following tree:

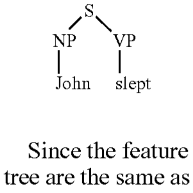

Since the feature structure constraints associated with this tree are the same as the feature structure constraints given in the input (except perhaps for the order in which they appear), this is a valid generation tree. If the feature structure constraints associated with the tree had more or less constraints than the input, then this would not be a valid generation tree. If we just take the leaves of this tree we get "John slept" as the output of the generator.

In general, generation is the inverse of parsing. If parsing a particular string of words produces a particular abstract representation of meaning, then generating with that meaning and the same grammar should produce the same string of words. However, the relationship is not one-to-one. For instance, parsing "John saw the girl with the telescope" may produce two abstract representations:

(f1 PRED)='see<f2, f3>'
(f1 TENSE)=PAST
(f1 SUBJ)=f2
(f2 PRED)='John'
(f1 OBJ)=f3
(f3 PRED)='girl'
(f3 SPEC)=the
f4 $ (f3 MODIFIERS)
(f4 PRED)='with<f5>'
(f4 OBJ)=f5
(f5 PRED)='telescope'
(f5 SPEC)=the and (f1 PRED)='see<f2, f3>'
(f1 TENSE)=PAST
(f1 SUBJ)=f2
(f2 PRED)='John'
(f1 OBJ)=f3
(f3 PRED)='girl'
(f3 SPEC)=the
f4 $ (f1 MODIFIERS)
(f4 PRED)='with<f5>'
(f4 OBJ)=f5
(f5 PRED)='telescope'
(f5 SPEC)=the These are identical except that the first has f4 $ (f3 MODIFIERS) and the second has f4 $ (f1 MODIFIERS). The $ notation in f4 $ (f3 MODIFIERS) says that f4 is a member of the set denoted by (f3 MODIFIERS). This notation allows a sentence to have an unbounded number of modifiers. f4 $ (f3 MODIFIERS) means that "with a telescope" modifies "the girl". f4 $ (f1 MODIFIERS) means that "with a telescope" modifies "saw".

If we take the second representation and generate from it, we get "John saw the girl with the telescope". We may also get "With the telescope, John saw the girl" and other sentences with similar meanings. Whether or not we get other sentences depends on the details of the grammar. For instance, if the grammar has a feature that indicates that "with the telescope" comes before the verb, then the generator will not produce "With the telescope, John saw the girl" since the feature structure for this sentence will include a feature that is not in the input.

Martin Kay's Generation Chart

In 1996, Martin Kay proposed to take the notion of "chart" that was popular in parsing and apply it to generation as disclosed in Kay, Martin, 1996, "Chart Generation", 34th Annual Meeting of the Association for Computational Linguistics, Santa Cruz, Calif., pp. 200–204. In parsing, a chart is a data structure that caches the results of certain parsing operations. A chart consists of a set of data structures called edges and subtrees. An "edge" represents a substring of the string of words being parsed. It consists of a category (such as NP or VP), the position where the substring begins, and the position where the substring ends. The category indicates that this substring can be analyzed as the given category according to the given grammar. A "subtree" is a record of how an edge is constructed. It consists of the daughter edges that were used to construct the given edge. The subtrees for an edge are usually stored in the edge. We will use the notation CAT[i,j] for an edge, where CAT is the edge's category, i is the position of the beginning of the substring that the edge covers, and j is the position of the end of the substring that the edge covers.

To give an example of how a chart works in parsing, consider the sentence "John slept". Putting identifiers between the words produces "1 John 2 slept 3". When we discover that "John" can be analyzed as an NP, we add NP[1,2]→John to the chart, where NP[1,2] is an edge and John is a subtree. The 1 and 2 in NP[1,2] indicate that this edge covers the substring from 1 to 2. When we discover that "slept" can be analyzed as a VP, we add VP[2,3]→slept to the chart. Then we notice that since NP[1,2] ends with the same identifier that VP[2,3] begins with, we can add S[1,3]→NP[1,2] VP[2,3] to the chart. It is standard to index edges by the left and right identifiers so that deductions like this can be made quickly.

If a grammar is highly ambiguous, then using a parsing chart can make a huge difference in speed since it avoids reanalyzing substrings over and over again. In fact, it has been shown that for simple phrase structure grammars, the time taken to a parse a sentence is a cubic function of the length of the sentence in the worst case. The time taken to parse a sentence without using a chart or its equivalent can be an exponential function in the length of the sentence in the worst case.

Martin Kay's idea was to use a chart during generation. However, instead of having an edge indicate which of the words it covers, Martin proposed that an edge would indicate which of the semantic facts in the abstract meaning it covered, plus the feature structure variable that the edge corresponded to. We will use the notation CAT[var]{fact1 . . . factN} for such an edge, where CAT is the category (like NP or VP), "var" is the feature structure variable, and fact1 to factN are the semantic facts that the edge covers (e.g. includes in itself or one of its descendents).

Martin Kay's notion of semantic fact is a fact that is used in the semantics that cannot be duplicated. There can only be one instance of each semantic fact in the output, because duplicating semantic facts changes the meaning of the sentence. If the input only has one instance of a semantic fact, then the output of the generator should only include one instance of a semantic fact. In Martin Kay's algorithm, two edges cannot be combined into another edge if they share any semantic facts. The fact that semantic facts cannot be duplicated is very important, and will allow us to make a significant optimization later on.

Martin Kay's notion of semantic fact corresponds to constraints like (f2 PRED)='sleep<f1>' in LFG. To make the examples easier to read, we will use the predicate name of a semantic fact (e.g. "sleep") to represent it in the all of the examples below, and we will never have an example with more than one semantic fact with the same predicate name.

If we wanted to use Martin Kay's algorithm to generate from the input:

(f2 PRED)='sleep<f1>'
(f2 TENSE)=PAST
(f2 SUBJ)=f1
(f1 PRED)='John' then we might first add NP[f1]{John}→John to the generation chart. (The "John" in the curly brackets represents the semantic fact (f1 PRED)='John', as discussed above.) Then we would add VP[f2]{sleep}→slept. Then we would notice that we could combine NP[f1]{John} and VP[f2]{sleep} to get S[f2]{John,sleep}→NP[f1]{John} VP[f2]{sleep}. Since this last edge covers all of the semantic facts and is consistent with the input, it is a well-formed generation according to Martin Kay's algorithm.

This definition of generation isn't quite right for Lexical Functional Grammars, since it doesn't guarantee that non-semantic facts like (f2 TENSE)=PAST or (f2 SUBJ)=f1 are expressed by the output of the generator. One might be tempted to treat these as semantic facts in Martin Kay's algorithm, but then his algorithm would give the wrong results because it assumes that semantic facts can only be expressed once, whereas these facts can be expressed many times in Lexical Functional Grammars without changing the meaning of the sentence. For now we will ignore the problem, but later we will describe techniques for dealing with non-semantic facts.

The advantage of a generation chart is that it avoids computing the same information over and over again. However, it is not as efficient as a parsing chart. This is because the number of edges in a generation chart can be an exponential function of the size of the input, whereas the number of edges in a parsing chart is at most a quadratic function of the size of the input. The difference is that in a parsing chart, the words that are covered by an edge are contiguous. Since there are only a quadratic number of different substrings in a string, the number of edges is a quadratic function in the length of the string. However, there is no requirement that the semantic facts in the input to generation be contiguous. An edge could cover any subset of the semantic facts in the input. Since there can be an exponential number of subsets of a set, there can be an exponential number of edges in a generation chart.

For example, consider the following LFG rules:

S→NP: (∧ SUBJ)=!; VP: ∧=!.

VP→V: ∧=!; (NP: (∧ OBJ)=!).

NP→{N: ∧=!|

A: ! $ (∧ MODIFIERS); NP: ∧=!}.

These rules are a little more complicated than the LFG rule that we looked at before. First of all, the VP rule says that the object NP and its constraints are optional by enclosing it in parentheses. This is to allow for both transitive sentences (such as "John kicked the ball") and intransitive sentences (such as "John slept"). Second, the NP rule says that there are two ways to build an NP. The two different ways are enclosed in curly brackets and separated by a vertical bar. The first way is to have a single N. The second way is to have an A (an adjective) followed by an NP.

Now suppose that we had the following lexical entries:

black A (∧ PRED)='black'.

dogs N (∧ PRED)='dog'

(∧ NUM)=PL.

chase V (∧ PRED)='chase<(∧ SUBJ)(∧ OBJ)>'

(∧ TENSE)=PRES.

white A (∧ PRED)='white'.

cats N (∧ PRED)='cat'

(∧ NUM)=PL.

and we wanted to generate from the following input:

(f1 PRED)='chase<f2,f4>'
(f1 SUBJ)=f2
(f2 PRED)='dog'
(f2 NUM)=PL
f3 $ (f2 MODIFIERS)
(f3 PRED)='black'
(f1 OBJ)=f4
(f4 PRED)='cat'
(f4 NUM)=PL
(f5 $ (f4 MODIFIERS)
(f5 PRED)='white'

If we make all of the lexical entries be edges in the generation chart and start combining them according to the rules given, we get the following added to the chart:

A[f5]{white}→white
N[f4]{cat}→cats
NP[f4]{cat}→N[f4]{cat}
NP[f4]{white,cat}→A[f5]{white} NP[f4]{cat}
V[f1]{chase}→chase
VP[f1]{chase}→V[f1]{chase}
VP[f1]{chase,cat}→V[f1]{chase} NP[f4]{cat}
VP[f1]{chase,white,cat}→V[f1]{chase} NP[f4]{white,cat}
A[f3]{black}→black
N[f2]{dog}→dogs
NP[f2]{dog}→N[f2]{dog}
NP[f2]{black,dog}→A[f3]{black} NP[f2]{dog}
S[f1]{dog,chase}→NP[f2]{dog} VP[f1]{chase}
S[f1]{black,dog,chase}→NP[f2]{black,dog} VP[f1]{chase}
S[f1]{dog,chase,cat}→NP[f2]{dog} VP[f1]{chase,cat}
S[f1]{dog,chase,white,cat}→NP[f2]{dog} VP[f1]{chase,white,cat}
S[f1]{black,dog,chase,cat}→NP[f2]{black,dog} VP[f1]{chase,cat}
S[f1]{black,dog,chase,white,cat}→NP[f2]{black,dog} VP[f1]{chase,white,cat}

The last edge generates "black dogs chase white cats". However, in the process of producing this sentence, the generator also builds top-level edges for "black dogs chase cats", "dogs chase white cats", "dogs chase cats", "black dogs chase", and "dogs chase". These are all ruled incomplete at the top since they are missing facts in the input. However, they add a considerable amount of time to the generation process. The problem gets much worse as you add more modifiers. (Consider all of the incomplete generations that would be produced in the process of generating something like "Big mean ugly black dogs chase little cute white cats".)

Martin Kay and Internal Indices

Martin Kay solved this problem by distinguishing between internal and external indices. In the grammatical formalism that Martin Kay used, categories are annotated with the semantic indices that are accessible. For instance, here is the rule that says that a VP can have an NP object:

vp(x,y)→v(x,y,z) np(z).

This rule says that a vp category consisting of two semantic indices named x and y can be composed of a v category consisting of three semantic indices named x, y, and z followed by an np category consisting of one semantic index named z. Note that the v category and the np category share the semantic index named z. This index make the np the object of the v. Note further that the vp does not have the z index in its category. Martin Kay observed that since the z index is not accessible in the vp(x,y) category, it will never be accessible to any higher categories. This means that no new facts can be added that refer to the z index. So, the vp(x,y) had better have all of the facts in the input that refer to the z index. If the vp(x,y) category is missing a fact that refers to the z index, then all categories built upon it will be missing the fact, too. This means that the root category will be missing the fact, and it will be discarded as being incomplete. Therefore we can safely discard any vp(x,y) category that is missing facts that refer to the z index.

To see how this works, consider how one might generate "black dogs chase white cats" using a grammar in Martin Kay's grammatical formalism. Suppose that we had the following rules and lexical entries:

s(x)→np(y) vp(x,y)

vp(x,y)→v(x,y,z) np(z)

np(n)→adj(n) np(n)

| | | |
|---|---|---|
| black | adj(d) | black(d) |
| dogs | np(d) | dogs(d) |
| chase | v(x, d, c) | chase(x, d, c) |
| white | adj(c) | white(c) |
| cats | np(c) | cats(c) |

If we add these lexical entries to the chart and start combining edges we get the following additions to the generation chart:

adj(c){white}→white np(c){cats}→cats np(c){white,cats}→np(c){white} adj(c){cats} v(x,d,c){chase}→chase vp(x,d){chase,white,cats}→v(x,d,c){chase} np(c){white, cats} vp(x,d){chase,cats}→v(x,d,c){chase} np(c){cats} INCOMPLETE!

adj(d){black}→black np(d){dogs}→dogs np(d){black,dogs}→adj(d){black} np(d){dogs} s(x){black,dogs,chase,white,cats}→np(d){black,dogs} vp(x,d){chase,white,cats} s(x){dogs,chase,white,cats}→np(d){dogs} vp(x,d){chase,white,cats} INCOMPLETE!

Note that two edges are eliminated due to incomplete internal indices: vp(x,d){chase,cats} and s(x){dogs,chase, white,cats}. Although this may not seem like much in a short sentence like this, this technique can make a huge difference for long sentences. For this type of grammatical formalism, this technique reduces the number of edges from being typically exponential in the size of the input to being typically linear in the size of the input.

Unfortunately, this technique does not work for grammar formalisms that do not explicitly indicate which indices are internal and which are external. Arturo Trujillo proposed an algorithm for deriving this information from a grammar in Trujillo, Arturo, 1997, "Determining internal and external indices for chart generation", Proc. of the 7th International Conference on Theoretical and Methodological Issues in Machine Translation (TMI-97), but this can be difficult for expressive grammar formalisms such as Lexical Functional Grammars and suffers from another problem which is described in the next section. John Carroll, Ann Copestake, Dan Flickinger and Victor Poznanski propose an improvement to Martin Kay's algorithm which treats intersective modifiers in a second pass in John Carroll, Ann Copestake, Dan Flickinger, and Victor Poznanski, 1999, "An efficient chart generator for (semi-)lexicalist grammars", Proceedings of the 7th European Workshop on Natural Language Generation (EWNLG'99), pages 86–95, Toulouse. It uses Martin Kay's algorithm for the first pass, and so assumes that internal indices can be determined locally. This means that it would also be Inefficient for Lexical Functional Grammars.

SUMMARY

An efficient algorithm for generating with Lexical Functional Grammars which uses construction and analysis of generation guides to determine internal facts and eliminate incomplete edges prior to constructing a generation chart. The generation guide can then be used in the construction of the generation chart to efficiently generate with context-free grammars that are annotated with semantic facts. The generation guide is an instance of a grammar that has been specialized to the input and only contains those parts of the grammar that are relevant to the input. When the generation guide is analyzed to determine internal facts a smaller generation chart is produced.

Figure 1:
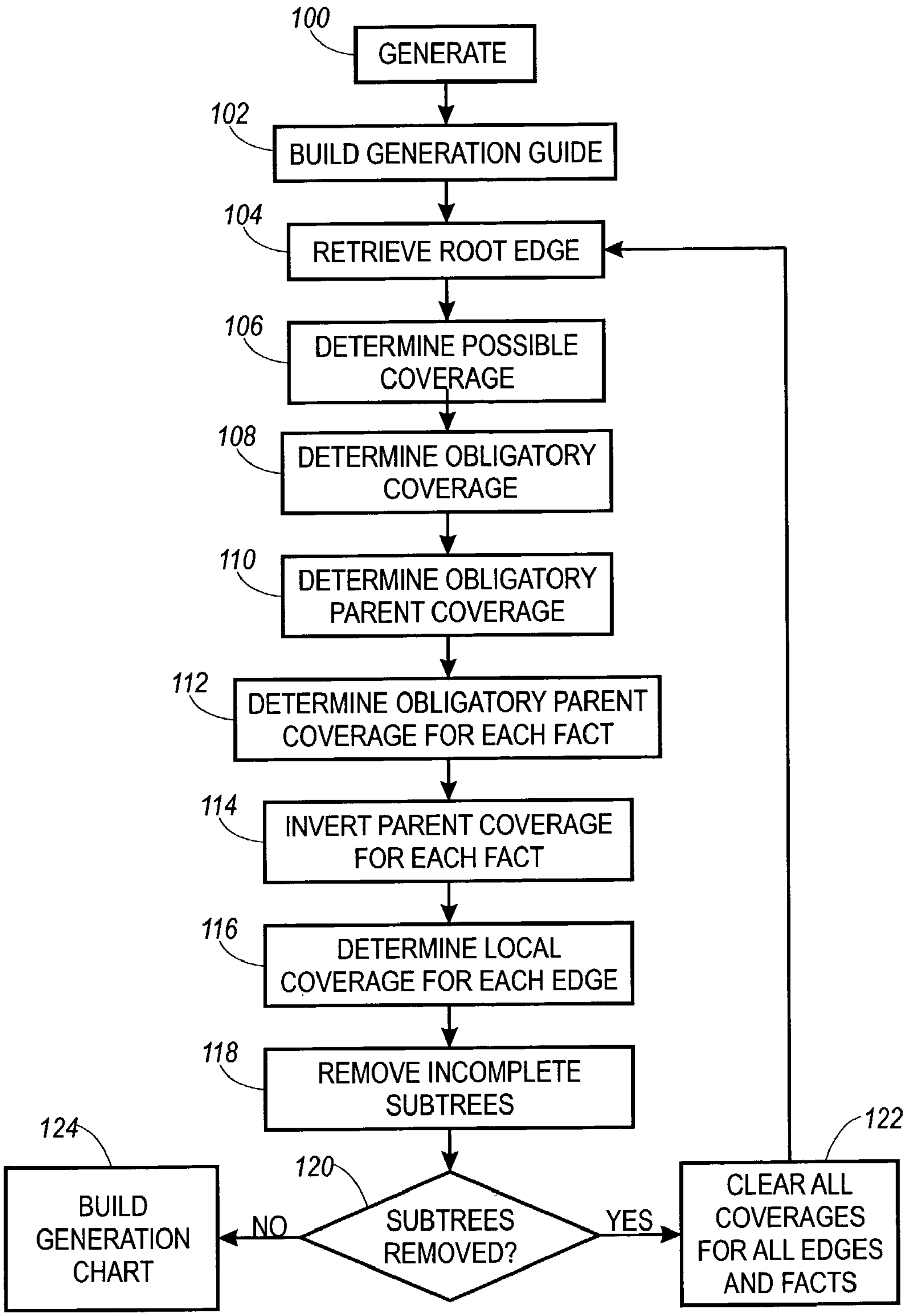
FIG. 1 is a flow chart showing the process of generating according to the present invention.

While the present invention will be described in connection with a preferred embodiment and/or method of use, it will be understood that it is not intended to limit the invention to that embodiment and procedure. On the contrary, it is intended to cover all alternatives, modifications and equivalents as may be included within the spirit and scope of the invention as defined by the appended claims.

Glossary of Terms

In the description that follows, the following terms shall have the following meanings:

active edge—an edge that represents a partial rule.

agenda—a list of edges that need to be processed.

arc—a data structure that indicates how a partial rule can be added on to. It has a daughter category and constraints that indicate how the feature structure associated with the daughter category is related to the feature structure of the edge's category. For simplicity, we assume that the constraints are non-disjunctive.

chart—a data structure that caches the result of certain parsing or generation operations in edges and subtrees.

Categorial grammar—a grammar that consists entirely of lexical entries annotated with semantic indices. There are a few general rules about how the lexical edges can be combined.

category—the class that a phrase structure belongs to, such as S (for sentence), NP (for noun phrase), or P (for preposition).

constraint—see feature structure constraint.

coverage—the set of facts that an edge can express.

daughter—a category that is immediately under another category in a tree of categories. Also, an edge that is immediately under another edge.

edge—a data structure used in a chart to indicate that a substring of words can have a particular category (in parsing) or that a collection of semantic facts can be expressed by a particular category (in generation).

express—A fact is expressed by an edge if it is included in the constraints associated with the edge or one of its descendents. A word is expressed by an edge if is a descendent of the edge that is a leaf edge.

fact—see semantic fact.

feature structure—an abstract representation that has features with values. The values can be constants, semantic facts, feature structures, or sets of values.

feature structure constraint—a partial description of a feature structure.

generation—the process of going from an abstract representation of meaning to one or more strings of words given a grammar.

grammar—a declarative representation of the relationship between strings of words and their meanings for a particular language.

guide—a data structure that guides the construction of something else by limiting the range of choices.

inactive edge—an edge that represents a completed rule.

lexical entry—an entry that associates categories and feature structure constraints with a particular word.

Lexical Functional Grammar (LFG)—a grammar based on a particular theory of language that has phrase structure rules annotated with feature structure constraints.

mother—a category that is immediately above another category in a tree of categories. Also, an edge that is immediately above another edge.

meta-variable—a variable whose value is a feature structure variable.

obligatory fact—a fact that is included in every expression of an edge.

obligatory parent facts—facts that are obligatory somewhere in every parent path of an edge. Also, facts that are obligatory parent facts in every subtree that another fact is introduced in.

parent path—a path from an edge up to the root edge.

parsing—the process of going from a string of words to one or more abstract representations of meaning given a grammar.

phrase structure—a representation of the structure of a linguistic phrase (e.g. noun phrase, verb phrase, preposition phrase).

phrase structure rule—a rule that describes valid phrase structures.

predicate—a semantic function that takes zero or more arguments.

predicate-argument structure—the predicates of a sentence along with their arguments.

requestor—a data structure consisting of an edge and an arc that extends the edge. It is requesting an edge that has the same category as the daughter category of the arc and that has a feature structure identifier that is consistent with the feature structure identifier of the requestor's edge and the arc's constraints.

root—the top-most category or edge.

rule—see phrase structure rule.

semantic fact—a piece of information that represents part of the semantics of a sentence, such as a piece of the predicate-argument structure of the sentence. A semantic fact cannot be expressed more than once without changing the meaning of a sentence.

semantic index—an identifier used by semantic facts.

sister—two edges are sisters if the are daughters of the same mother.

subtree—a record of how an edge is constructed. It consists of the daughter edges that were used to construct a particular edge.

source edge—A source edge is effectively a request to build an edge with certain properties.

vertex—a data structure that contains just the category and the feature structure identifier of an edge.

DETAILED DESCRIPTION

Our proposal is to detect incomplete edges early in unification-based grammars by building a generation guide. The generation guide is a simplified version of a generation chart that can be built relatively quickly. We will then analyze the generation guide to determine where edges can become incomplete. There are two techniques that we will use to detect incomplete edges. The first is to analyze the edges that are external to an edge in the guide to determine whether the semantic facts that are inside the edge are still expressible outside of the edge. If they are not, then they are considered internal facts. The second is to analyze the cooccurence relations between semantic facts to determine which facts have obligatory parent facts. The obligatory parent facts can be used to restrict the placement of the facts. Once we are done analyzing the generation guide, we use it to guide the construction of the generation chart, eliminating incomplete edges before they are constructed using the information that we have gathered by analyzing the generation guide.

The generation guide can be thought of as an instance of the grammar that has been specialized to the input. It only contains the parts of the grammar that are relevant to the input. This means that analyzing the guide to determine internal facts can produce a smaller generation chart than analyzing the grammar. This happens when the part of the grammar that makes a semantic fact external to an edge is missing from the specialized grammar. Edges that don't have this fact can be eliminated early after analyzing the generation guide, but not after analyzing the grammar. Analyzing the generation guide is thus more efficient than analyzing the grammar as described by Arturo Trujillo in his work.

Building a Generation Guide

A generation guide is just like a generation chart except that it doesn't record the coverage of each edge. Instead, an edge is just a category and a feature structure identifier (e.g. NP[f1]). For instance, suppose we want to generate "black dogs chase white cats" using the same input and LFG grammar given above, then we would add the following edge and subtrees to the generation guide:

A[f5]→white
N[f4]→cats
NP[f4]→N[f4]
NP[f4]→A[f5] NP[f4]
V[f1]→chase
VP[f1]→V[f1]
VP[f1]→V[f1] NP[f4]
A[f3]→black
N[f2]→dogs
NP[f2]→N[f2]
NP[f2]→A[f3] NP[f2]
S[f1]→NP[f2] VP[f1]

The edges are the elements A[f5], N[f4], NP[f4], V[f1], VP[f1], A[f3], N[f2], S[f1], white, cats, chase, black, and dogs. Some of these edges have special relationships. A mother edges is an edge that is immediately above another edge therefore, for instance, edge NP[f4] is a mother edge to daughter edges A[f5] and NP[f4] and edges A[f5] and NP[f4] are sister edges to each other. Edges white, cats, chase, black, and dogs are leaf edges. In this example, the leaf edges have been made to be equal the semantic facts for ease of description, but need not be so. A subtree is any one of the relationships described above between edges. Therefore, A[f5]→white is a subtree as is VP[f1]→V[f1] NP[f4]. NP[f2]→A[f3] NP[f2] is a recursive subtree because it references itself.

If there are multiple subtrees for the same edge, such as NP[f2]→N[f2], and NP[f2]→A[f3] NP[f2], these subtrees can be collapsed into a disjunction NP[f2]→{N[f2]|A[f3] NP[f2]}. This is still an edge, but it says that NP[f2] has two possible alternatives N[f2], and A[f3]NP[f2]. The curly brackets are used to enclose all the alternatives with the vertical line serving to separate them as an "or". When all the subtrees have been collapsed the resulting generation guide looks like:

A[f3]→black
N[f2]→dogs
NP[f2]→{N[f2]|A[f3] NP[f2]}
V[f1]→chase
A[f5]→white
N[f4]→cats
NP[f4]→{N[f4]|A[f5] NP[f4]}
VP[f1]→{V[f1]|V[f1] NP[f4]}
S[f1]→NP[f2] VP[f1]

Note that NP[f2], NP[f4], and VP[f1] have disjunctions after their arrows. This is to indicate that they have two different subtrees (e.g. two different ways of being formed). Note also that NP[f2] and NP[f4] refer to themselves in their second subtrees or are recursive.

Using this guide, we can express a number of different possible sentences. The root S[f1] can only consist of an NP[f2] and a VP[f1]. However, the NP[f2] can consist of an N[f2], or an A[f3] and an NP[f2]. The N[f2] can only consist of the word "dogs". The A[f3] can only consist of the word "black". However the NP[f2] that follows the A[f3] is again ambiguous. That means that the NP[f2] can be expressed as "dogs", "black dogs", "black black dogs", "black black black dogs", and so on. So this generation guide is a compact representation of an unbounded number of sentences, most of which either have too few or too many words in them. In spite of this, it is a very useful guide for generation.

Detecting Internal Facts

We can use this guide to detect that some facts only occur inside certain subtrees of an edge or in any edges of the subtree, including recursions. We start by assuming that every semantic fact is internal to the edge that it occurs in until we find evidence to the contrary. We initialize the process by associating each edge with the semantic facts that it can express. This is similar to what we did for the generation chart, but now each edge is associated with the set of semantic facts that the edge could express in ANY of its possibilities instead of the set of semantic facts that the edge MUST express in ALL of its possibilities. Here are the initial associations we get:

internal(A[f3])={black}
internal(N[f2])={dog}
internal(NP[f2])={black,dog}
internal(V[f1])={chase}
internal(A[f5])={white}
internal(N[f4])={cat}
internal(NP[f4])={white,cat}
internal(VP[f1])={chase,white,cat}
internal(S[f1])={black,dog,chase,white,cat}

Note that NP[f4] only has 'white' in its set of facts once even though 'white' can be expressed many times by NP[f4] because of the self-reference in its second subtree.

We next determine which facts are obligatory on an edge. These are the facts that must occur in every expansion of the edge. For instance, 'cat' is obligatory in NP[f4], because it occurs in both subtrees of NP[f4]. However, 'white' is not obligatory because it only occurs in one subtree. Here are the obligatory associations that we get:

obligatory(A[f3])={black}
obligatory(N[f2])={dog}
obligatory(NP[f2])={dog}
obligatory(V[f1])={chase}
obligatory(A[f5])={white}
obligatory(N[f4])={cat}
obligatory(NP[f4])={cat}
obligatory(VP[f1])={chase}
obligatory(S[f1])={dog,chase}

We next consider sister edges with shared semantic facts. If a semantic fact is shared, this means that the fact could occur in either edge. It means that this fact is not necessarily internal to either edge. So we eliminate the semantic fact from the internal facts of both edges. However, if the semantic fact is obligatory in one edge, then we do not eliminate it from the internal facts of that edge.

In the current example, the subtree NP[f2]→A[f3] NP[f2] means that A[f3] and NP[f2] are sisters. Since internal(A[f3])={black} and internal(NP[f2])={black,dog}, these sister edges have a shared semantic fact. Since 'black' is obligatory in A[f3], we only eliminate it in the internal facts for NP[f2], producing internal(NP[f2])={dog}. The subtree NP[f4]→A[f5] NP[f4] means that A[f5] and NP[f4] are sister edges. Since internal(A[f5])={white} and internal(NP[f4])={white,cat}these sister edges have a shared semantic fact. In this case we eliminate 'white' from NP[f4]'s internal facts. There are no more sister edges with shared semantic facts. Thus, we end up with the following associations:

internal(A[f3])={black}
internal(N[f2])={dog}
internal(NP[f2])={dog}
internal(V[f1])={chase}
internal(A[f5])={white}
internal(N[f4])={cat}
internal(NP[f4])={cat}
internal(VP[f1])={chase,white,cat}
internal(S[f1])={black,dog,chase,white,cat}

Now we can use these associations to guide the construction of a generation chart. Whenever we are about to add an edge for the generation chart, we get the set of internal facts that are associated with its corresponding edge in the guide. If the edge is missing any of the internal facts, then we do not add it to the chart. Here is what gets added to the generation chart:

A[f5]{white}→white
(OK because internal(A[f5])={white})
N[f4]{cat}→cats
(OK because internal(N[f4])={cat})
NP[f4]{cat}→N[f4]{cat}
(OK because internal(NP[f4])={cat})
NP[f4]{white,cat}→A[f5]{white} NP[f4]{cat}
(OK because internal(NP[f4])={cat})
V[f1]{chase}→chase
(OK because internal(V[f1])={chase})
VP[f1]{chase}→V[f1]{chase}
(IGNORED because internal(VP[f1])={chase,white,cat} and VP[f1]{chase} is missing 'white' and 'cat')
VP[f1]{chase,cat}→V[f1]{chase} NP[f4]{cat}
(IGNORED because internal(VP[f1])={chase,white,cat} and VP[f1]{chase,cat} is missing 'white')
VP[f1]{chase,white,cat}→V[f1]{chase} NP[f4]{white, cat}
(OK because internal(VP[f1])={chase,white,cat})
A[f3]{black}→black
(OK because internal(A[f3])={black})
N[f2]{dog}→dogs
(OK because internal(N[f2])={dog})
NP[f2]{dog}→N[f2]{dog}
(OK because internal(NP[f2])={dog})
NP[f2]{black,dog}→A[f3]{black} NP[f2]{dog}
(OK because internal(NP[f2])={dog})
S[f1]{dog,chase,white,cat}→NP[f2]{dog} VP[f1]{chase, white,cat}
(IGNORED because internal(S[f1])={black,dog,chase, white,cat} and
S[f1]{dog,chase,white,cat} is missing 'black')
S[f1]{black,dog,chase,white,cat}→NP[f2]{black,dog} VP[f1]{chase,white,cat}
(OK because internal(S[f1])={black,dog,chase,white,cat})

Note that VP[f1]{chase}, VP[f1]{chase,cat}, and S[f1]{dog,chase,white,cat} are not added to the generation chart because they are missing facts that are internal to these edges. Note furthermore that we do not even consider adding subtrees like S[f1]→NP[f2]{black,dog} VP[f1]{chase} since the VP[f1]{chase} edge wasn't added to the generation chart.

An Issue

Although the algorithm given in the previous section works well for simple cases, it has some weaknesses that become apparent when things become more complicated. For instance, suppose that we have the following LFG rules:

S→NP: (∧ SUBJ)=!; VP: ∧=!.
VP→{V: ∧=!
|VP: ∧=!; PP: ! $ (∧ MODIFIERS)}
PP→P: ∧=!; (NP: (∧ OBJ)=!), and lexical entries:

John NP (∧ PRED)='John'
walked V (∧ PRED)='walked'
with P (∧ PRED)='with<(∧ OBJ)>
Bill NP (∧ PRED)='Bill'
on P (∧ PRED)='on<(∧ OBJ)>'
Monday NP (∧ PRED)='Monday'

Note that the NP in the PP rule is optional. This is to allow for sentences like "What day did John walk with Bill on?".

Suppose that we wanted to generate "John walked with Bill on Monday" from the following input constraints:

(f1 PRED)='walked<f2>'
(f1 SUBJ)=f2
(f2 PRED)='John'
(f3 PRED)='with<f4>'
(f3 OBJ)=f4
(f4 PRED)='Bill'
f3 $ (f1 MODIFIERS)
(f5 PRED)='on<f6>'
(f5 OBJ)=f6
(f6 PRED)='Monday'
f5 $ (f1 MODIFIERS)
f3<h f4

The last constraint, "f3<h f4", says that f3 must come before f4 in the output. This prevents the generator from generating "John walked on Monday with Bill".

Our first step is to build a generation guide:

NP[f2]→John
V[f1]→walked
P[f3]→with
NP[f4]→Bill
PP[f3]→{P[f3]|P[f3] NP[f4]}
P[f5]→on
NP[f6]→Monday
PP[f5]→{P[f5]|P[f5] NP[f6]}
VP[f1]→{V[f1]|VP[f1] PP[f3]|VP[f1] PP[f5]}
S[f1]→NP[f2] VP[f1]

We then determine the obligatory facts:

obligatory(NP[f2])={John}
obligatory(V[f1])={walked}
obligatory(P[f3])={with}
obligatory(NP[f4])={Bill}
obligatory(PP[f3])={with}
obligatory(P[f5])={on}
obligatory(NP[f6])={Monday}
obligatory(PP[f5])={on}
obligatory(VP[f1])={walked}
obligatory(S[f1])={John,walked}

We then initialize the internals of each edge to be the set of facts expressed anywhere within the edge:

internal(NP[f2])={John}
internal(V[f1])={walked}
internal(P[f3])={with}
internal(NP[f4])={Bill}
internal(PP[f3])={with,Bill}
internal(P[f5])={on}
internal(NP[f6])={Monday}
internal(PP[f5])={on,Monday}
internal(VP[f1])={walked,with,Bill,on,Monday}
internal(S[f1])={John,walked,with,Bill,on,Monday}

We then look at sister edges that have shared semantic facts. The sisters VP[f1] and PP[f3] share 'with' and 'Bill'.

We eliminate 'with' from VP[f1] but not PP[f3] (since it is obligatory). We eliminate 'Bill' from both. The sisters VP[f1] and PP[f5] share 'on' and 'Monday'. We eliminate 'on' from VP[f1] but not PP[f5] (since it is obligatory). We eliminate 'Monday' from both. These are the only sisters with shared facts. This leaves us with:

internal(NP[f2])={John}
internal(V[f1])={walked}
internal(P[f3])={with}
internal(NP[f4])={Bill}
internal(PP[f3])={with}
internal(P[f5])={on}
internal(NP[f6])={Monday}
internal(PP[f5])={on}
internal(VP[f1])={walked}
internal(S[f1])={John,walked,with,Bill,on,Monday}

Note that 'Bill' is not considered to be internal to PP[f3], even though this is the only place that it can occur and it is not in an edge that refers to itself. Similarly for 'Monday' and PP[f5].

If we use this information to build a generation chart, we get the following:

NP[f2]{John}→John
V[f1]{walked}→walked
P[f3]{with}→with
NP[f4]{Bill}→Bill
PP[f3]{with}→P[f3]{with}
PP[f3]{with,Bill}→P[f3]{with} NP[f4]{Bill}
P[f5]{on}→on
NP[f6]{Monday}→Monday
PP[f5]{on}→P[f5]{on}
PP[f5]{on,Monday}→P[f5]{on} NP[f6]{Monday}
VP[f1]{walked}→V[f1]{walked}
VP[f1]{walked,with}→VP[f1]{walked} PP[f3]{with}
VP[f1]{walked,with,Bill}→VP[f1]{walked} PP[f3]{with, Bill}
VP[f1]{walked,on}→VP[f1]{walked} PP[f5]{on}
VP[f1]{walked,on,Monday}→VP[f1]{walked} PP[f5]{on, Monday}
VP[f1]{walked,with,on}→VP[f1]{walked,with} PP[f5]{on}
VP[f1]{walked,with,Bill,on}→VP[f1]{walked,with,Bill} PP[f5]{on}
VP[f1]{walked,with,on,Monday}→VP[f1]{walked,with} PP[f5]{on,Monday}
VP[f1]{walked,with,Bill,on,Monday}→VP[f1]{walked, with,Bill} PP[f5]{on,Monday}
S[f1]{John,walked,with,Bill,on,Monday}→NP[f2]{John} VP[f1]{walked,with,Bill,on,Monday}

Note the large number of VP[f1] edges that get constructed. Most of these are not combined with NP[f2]{John} to produce an S[f1] since they are incomplete at the S[f1] level. Most of the incomplete ones should have been filtered even earlier, since 'Bill' and 'Monday' can each only occur in one place. But the algorithm described above doesn't detect this.

We can improve the algorithm described above by detecting dependencies between the different facts. For instance, in the example given above, 'Bill' can only occur in the context of 'on'. Since 'on' is obligatory in PP[f3], then 'Bill' must be obligatory in PP[f3] also, even though the phrase structure rule says that the NP is optional. If we determine that 'Bill' is obligatory in PP[f3], then we won't remove it from PP[f3]'s internal facts when we are processing sister edges with shared facts. This means that we won't add PP[f3]{on} to the generation chart, since it is incomplete. Similarly for 'Monday' and PP[f5]. The result is that we won't even attempt to construct a large number of the VP[f1] edges.

Using Obligatory Parent Facts

Let us call a sequence of edges that leads from a particular edge up to the root edge a "parent path" of that edge. If a semantic fact is obligatory somewhere on every parent path of an edge, then we say that the semantic fact is an "obligatory parent fact" of that edge. Furthermore, if a semantic fact is an obligatory parent fact of every edge where another fact is introduced, then we say that the first fact is an obligatory parent fact of the second.

Obligatory parent facts are useful for eliminating incomplete edges in the generation chart. This is because at the point where an obligatory parent fact stops being obligatory, then any fact that had the first fact as its obligatory parent fact must already be included in the edge. If the second fact were added later, then it would have to have a different instance of the first fact as its obligatory parent fact, because once an instance of a fact stops being obligatory in a chart, then that instance cannot become obligatory again (because trees cannot be re-entrant). But you cannot have two instances of the same semantic fact in the same tree. Therefore, the second fact cannot be added later, and must already be included in the edge. If the second fact is not included in the edge, then the edge cannot lead to a complete solution, and so can be eliminated immediately.

Here is how to construct the obligatory parent facts for the semantic facts in the example given in the previous section. We start with the generation guide:

NP[f2]→John
V[f1]→walked
P[f3]→with
NP[f4]→Bill
PP[f3]→{P[f3]|P[f3] NP[f4]}
P[f5]→on
NP[f6]→Monday
PP[f5]→{P[f5]|P[f5] NP[f6]}
VP[f1]→{V[f1]|VP[f1] PP[f3]|VP[f1] PP[f5]}
S[f1]→NP[f2] VP[f1]

We determine the obligatory facts for each edge:

obligatory(NP[f2])={John}
obligatory(V[f1])={walked}
obligatory(P[f3])={with}
obligatory(NP[f4])={Bill}
obligatory(PP[f3])={with}
obligatory(P[f5])={on}
obligatory(NP[f6])={Monday}
obligatory(PP[f5])={on}
obligatory(VP[f1])={walked}
obligatory(S[f1])={John,walked}

We then walk down the chart from the root edge (S[f1]), collecting obligatory facts as we go. If an edge hasn't received obligatory parent facts, we assign the obligatory parent facts to the edge and continue. If the edge has received obligatory parent facts, we intersect the obligatory parent facts that it already has with the ones that we have computed. If the result is unchanged, then we don't go any further down this edge. If the result is smaller, we set the edge's obligatory parent facts to the result and continue down. This produces the following obligatory parent facts:

obligatory-parent-facts(NP[f2])={walked}
obligatory-parent-facts(V[f1])={}
obligatory-parent-facts(P[f3])={walked}
obligatory-parent-facts(NP[f4])={walked,with}
obligatory-parent-facts(PP[f3])={walked} obligatory-parent-facts(P[f5])={walked}
obligatory-parent-facts(NP[f6])={walked,on}
obligatory-parent-facts(PP[f5])={walked}
obligatory-parent-facts(VP[f1])={}
obligatory-parent-facts(S[f1])={}

Next we visit each subtree that has constraints with a semantic fact in them. If the semantic fact hasn't received obligatory parents, we set the obligatory parents of the fact to the obligatory parents of the subtree's edge. If it has received obligatory parents, we intersect the obligatory parents of the subtree's edge into the obligatory parents of the fact. For instance, 'Bill' appears in the constraints of NP[f4]→Bill. The obligatory parents of NP[f4] are 'walked' and 'with'. So the obligatory parents of 'Bill' become 'walked' and 'with'. Doing this for each semantic fact produces:

obligatory-parent-facts(John)={walked}
obligatory-parent-facts(walked)={}
obligatory-parent-facts(with)={walked}
obligatory-parent-facts(Bill)={walked,with}
obligatory-parent-facts(on)={walked}
obligatory-parent-facts(Monday)={walked,on}

We use the obligatory parent facts to detect internal facts by observing that at the point where a fact stops being obligatory, all of the facts that had the obligatory fact as an obligatory parent fact must be included. For instance, 'with' is obligatory in PP[f3], but not in VP[f1]. Since 'Bill' has 'with' as an obligatory parent fact, 'Bill' must be in PP[f3] when it is incorporated in VP[f1]. Since VP[f1] is the only mother of PP[f3], this means that 'Bill' must be in PP[f3].

Let us compute the internal facts again using obligatory parent facts. We start by initializing the internals of each edge to be the set of facts contained anywhere within the edge:

internal(NP[f2])={John}
internal(V[f1])={walked}
internal(P[f3])={with}
internal(NP[f4])={Bill}
internal(PP[f3])={with,Bill}
internal(P[f5])={on}
internal(NP[f6])={Monday}
internal(PP[f5])={on,Monday}
internal(VP[f1])={walked,with,Bill,on,Monday}
internal(S[f1])={John,walked,with,Bill,on,Monday}

We then look at sister edges that have shared semantic facts. The sisters VP[f1] and PP[f3] share 'with' and 'Bill'. We eliminate 'with' from the internals of VP[f1] but not PP[f3] (since it is obligatory). We eliminate 'Bill' from the internals of VP[f1], but this time we do not eliminate 'Bill' from the internals of PP[f3], since it has 'with' as an obligatory parent fact, 'with' is obligatory in PP[f3], and 'with' is not obligatory in the only possible mother of PP[f3]. The sisters VP[f1] and PP[f5] share 'on' and 'Monday'. We eliminate 'on' from the internals of VP[f1] but not PP[f5] (since it is obligatory). We eliminate 'Monday' from the internals of VP[f1], but we do not eliminate 'Monday' from the internals of PP[f5], since it has 'on' as an obligatory parent fact, 'on' is obligatory in PP[f5], and 'on' is not obligatory in the only mother of VP[f1]. These are the only sisters with shared facts. This leaves us with:

internal(NP[f2])={John}
internal(V[f1])={walked}
internal(P[f3])={with}
internal(NP[f4])={Bill}
internal(PP[f3])={with,Bill}
internal(P[f5])={on}
internal(NP[f6])={Monday}
internal(PP[f5])={on,Monday}
internal(VP[f1])={walked}
internal(S[f1])={John,walked,with,Bill,on,Monday}

If we use this information to produce a generation chart, we get:

NP[f2]{John}→John
V[f1]{walked}→walked
P[f3]{with}→with
NP[f4]{Bill}→Bill
PP[f3]{with,Bill}→P[f3]{with} NP[f4]{Bill}
P[f5]{on}→on
NP[f6]{Monday}→Monday
PP[f5]{on,Monday}→P[f5]{on} NP[f6]{Monday}
VP[f1]{walked}→V[f1]{walked}
VP[f1]{walked,with,Bill}→VP[f1]{walked} PP[f3]{with, Bill}
VP[f1]{walked,on,Monday}→VP[f1]{walked} PP[f5]{on, Monday}
VP[f1]{walked,with,Bill,on,Monday}→VP[f1]{walked, with,Bill} PP[f5]{on,Monday}
S[f1]{John,walked,with,Bill,on,Monday}→NP[f2]{John} VP[f1]{walked,with,Bill,on,Monday}

Note that we do not add the edges PP[f3]{with} and PP[f5]{on} to the chart because these edges are incomplete. Because these edges are not added to the chart, we don't even consider adding the edges VP[f1]{walked,with}, VP[f1]{walked,with,on}, VP[f1]{walked,with,on,Monday}, VP[f1]{walked,with,Bill,on}, and VP[f1]{walked, on}.

Non-Semantic Facts

The algorithm described above only deals with semantic facts. It doesn't guarantee that all the non-semantic facts are expressed by the generator. Non-semantic facts can be included as semantic facts as long as they are allowed to freely combine (e.g. two edges can be combined to produce another edge if they share non-semantic facts, although they cannot be combined if they share semantic facts). Also, non-semantic facts cannot be used as obligatory parent facts. This is because when a non-semantic fact stops being obligatory, it is still possible for missing facts to appear elsewhere with another instance of the non-semantic fact.

Other Formalisms

The algorithm described above is effective for any grammatical formalism which has a phrase structure component (either explicit or implicit) and which is semantically monotonic (that is, the semantic facts cannot change or be deleted once they are included in a generation chart). For instance, it can work with Categorial Grammars, Head-driven Phrase Structure Grammars (HPSGs), and Shake-and-Bake grammars.

Variations

Our preferred implementation is to use internal facts and obligatory parent facts together as described in the algorithm above. However, the two ideas are independent and can be used separately. For instance, we can change the algorithm for producing a generation chart to just use obligatory parent facts when deciding whether or not an edge is incomplete. If a subtree has an edge with an obligatory fact that is not obligatory in the edge containing the subtree, then any fact which has the obligatory fact as an obligatory parent fact cannot be missing. If any of these facts are missing, then the subtree is incomplete and should be discarded.

It also may be useful to use the results of analyzing the generation guide to improve the generation guide. The information obtained from the generation guide can sometimes be used to eliminate incomplete subtrees and edges from the guide itself. Then the resulting guide can be re-analyzed to obtain information about internal facts and obligatory parent facts. Sometimes new internal facts will be detected since some structures have been eliminated from the guide. If desired, this process can be continued until no new internal facts have been detected on the guide.

Another improvement is to use the edges in the generation guide instead of creating new generation chart edges whenever possible. Whenever the possible coverage and the internal coverage of a guide edge are identical, the guide edge can be used instead of a new chart edge. This is because there can be only one edge in the chart that matches this guide edge. If this is true for all of the edges in the guide, then the guide becomes the generation chart. It is also possible to consider the generation chart as a modification of the generation guide, where edges whose possible coverage and internal coverage do not match are replaced with edges with all of the different actual coverages that can be constructed bottom up from the last edges whose possible coverage and internal coverage were the same.

Implementation

Up to now, we have described the process for generating in very general terms. Now we will describe the process for generating in more detail using flow charts with their accompanying text.

FIG. 40 illustrates a computer, indicated by general reference character 1900, that incorporates the invention. The computer 1900 includes a processor 1902 having a central processor unit (CPU) 1904, a memory section 1906, and an input/output (I/O) section 1908. The I/O section 1908 can be connected to a presentation device 1912, a disk storage unit 1914 and a CD-ROM drive unit 1916. The CD-ROM drive unit 1916 can read a CD-ROM medium 1918 that typically contains a program and data 1920. The CD-ROM drive unit 1916 (along with the CD-ROM medium 1918) and the disk storage unit 1914 comprise a file storage mechanism (a file system). Some embodiments of the invention include a network interface 1922 that connects the computer 1900 to a network 1924. The network provides a data signal using electrical, electromagnetic, or optical techniques (for example, embodying data in a carrier wave). An application program 1926 executes from the memory section 1906. The application program 1926 can be loaded into the memory section 1906 over the network 1924 or from the file system. In one embodiment of the invention, the application program 1926 includes computer code that causes the computer to perform the inventive steps. The CD-ROM drive unit 1916 (along with the CD-ROM medium 1918) are illustrative of mechanisms that can be used to read computer code from a removable media. One skilled in the art will understand that the computer code can be provided from the network and that not all of the displayed features of the computer 1900 need to be present for the invention.

Returning to FIG. 1, a flowchart is shown which illustrates the generation procedure. The GENERATE procedure shown in FIG. 1 is the entry procedure for generating efficiently as described in the previous sections. It first calls a BUILD GENERATION GUIDE procedure, shown in FIGS. 2–6 which builds a generation guide as described in the earlier section "BUILDING A GENERATION GUIDE". After the generation guide has been built, the GENERATE procedure then calls a series of procedures DETERMINE POSSIBLE COVERAGE, DETERMINE OBLIGATORY COVERAGE, DETERMINE OBLIGATORY PARENT COVERAGE, DETERMINE OBLIGATORY PARENT COVERAGE FOR EACH FACT, and INVERT PARENT COVERAGE FOR EACH FACT, shown in FIGS. 7–11. These procedures are the steps in using obligatory parent facts in order to determine which facts are internal, as described in the earlier section "USING OBLIGATORY PARENT FACTS". Then the GENERATE procedure calls procedures DETERMINE LOCAL COVERAGE FOR EACH EDGE and REMOVE INCOMPLETE SUBTREES shown in FIGS. 12 and 14. These procedures use internal facts to prune incomplete edges early, as described in the earlier section "DETECTING INTERNAL FACTS". Finally, the GENERATE procedure calls BUILD GENERATION CHART described in FIGS. 16–18. This section builds a generation chart as described in the earlier section "GENERATION CHART", except that the construction of the chart is guided by the generation guide as described in the earlier section "EFFICIENT GENERATION FOR LEXICAL FUNCTIONAL GRAMMARS".

Returning to FIG. 1, the main procedure, GENERATE, which starts in box 100, first calls procedure BUILD GENERATION GUIDE to build a generation guide in box 102. This procedure will be discussed in more detail with FIGS. 2–6. Once the generation guide has been built then GENERATE gets the root edge of the generation guide in box 104. The root edge has the root category for the grammar and the root feature structure identifier for the input. It then calls DETERMINE POSSIBLE COVERAGE, discussed in more detail in FIG. 7, with the root edge to determine the possible coverage for each edge in the generation guide in box 106. After the possible coverages for each edge have been determined, GENERATE then calls DETERMINE OBLIGATORY COVERAGE, discussed in more detail in FIG. 8, again with the root edge to determine the obligatory coverage for each edge in the generation guide in box 108. Once the obligatory edge coverage has been determined GENERATE then calls DETERMINE OBLIGATORY PARENT COVERAGE in box 110, discussed in more detail in FIG. 9, with the root edge and empty coverage to determine the obligatory parent coverage for each edge in the guide using the information determined in DETERMINE POSSIBLE COVERAGE and DETERMINE OBLIGATORY COVERAGE. It then calls DETERMINE OBLIGATORY COVERAGE PARENT COVERAGE FOR EACH FACT in box 112, discussed in more detail in FIG. 10 to determine the obligatory parent coverage for each fact in the input using the information determined in DETERMINE OBLIGATORY PARENT COVERAGE. It then calls INVERT PARENT COVERAGE FOR EACH FACT in box 114, discussed in more detail in FIG. 11, to invert the parent coverage for each fact using the information computed in DETERMINE OBLIGATORY COVERAGE PARENT COVERAGE FOR EACH FACT. Once the parent coverage for each fact has been inverted, GENERATE calls DETERMINE LOCAL COVERAGE FOR EACH EDGE in box 116, discussed in more detail in FIG. 12, to determine the local coverage for each edge using the information determined in DETERMINE POSSIBLE COVERAGE, DETERMINE OBLIGATORY COVERAGE, and INVERT PARENT COVERAGE FOR EACH FACT. At this point, GENERATION then calls REMOVE INCOMPLETE SUBTREES in box 118 to remove subtrees from the generation guide that must produce incomplete solutions using information determined in DETERMINE LOCAL COVERAGE FOR EACH EDGE. Box 120 checks whether any subtrees were removed. If not, BUILD GENERATION CHART in box 124 is called. Otherwise, we reinitialize the auxiliary data structures and return to box 104 to reanalyze the smaller generation guide.

Finally when no more subtrees have been removed BUILD GENERATION CHART in, box 124 is called to build a generation chart using the information computed in DETERMINE LOCAL COVERAGE FOR EACH EDGE. The generation chart contains all of the valid generation trees in a packed form. The generation strings can be read off of the generation trees one at a time, or they can be read off of the whole chart as a unit.

Figure 2:
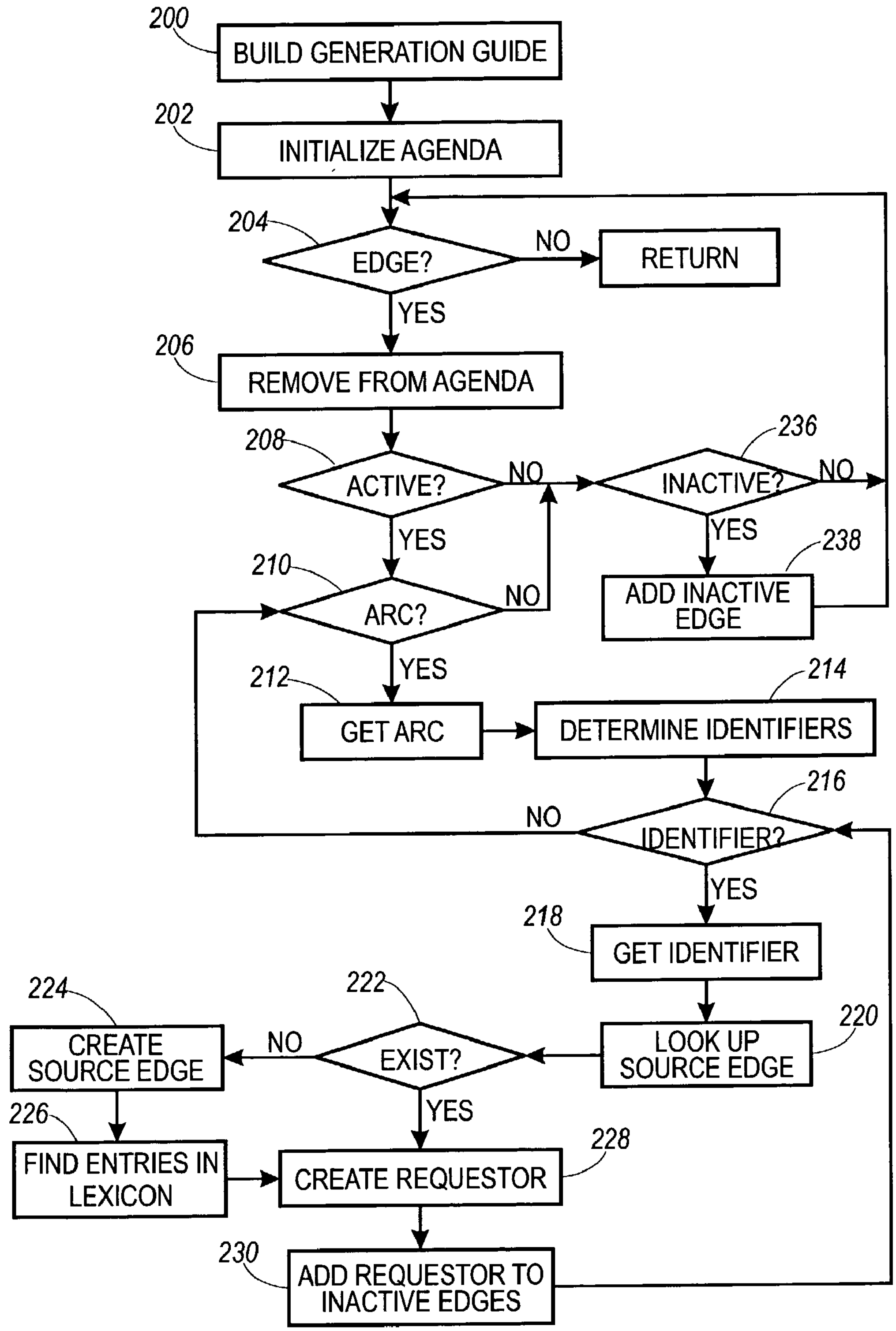
FIG. 2 is a flow chart showing the process of building a generation guide according to the present invention.
Figure 3:
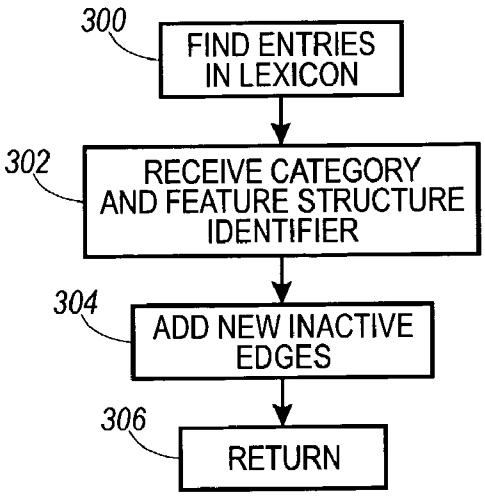
FIG. 3 is a flow chart showing the process of finding entries in a lexicon according to the present invention.

Turning to FIG. 2, the procedure BUILD GENERATION GUIDE builds a generation guide for the generator. The agenda is a standard chart parsing data structure that keeps track of what work is left to be done. It is a list of edges that still need to be processed. Box 202 initializes the agenda with a special type of edge called a source edge that has a root category of the grammar and the root feature structure identifier of the input. A source edge is effectively a request to build an edge with certain properties. The source edge in this case is a request to build an edge that has the root category of the grammar (usually S for sentence) and that has the root feature structure identifier of the input. Box 204 checks whether or not there are any edges on the agenda needing to be processed. If not, we return from BUILD GENERATION GUIDE to GENERATE.

If there are edges needing to be processed we remove the first edge from the agenda in box 206 and check whether the edge is active in box 208. An edge is active if it represents a partial rule. Source edges are active edges. If the edge is not active, then we go to box 236. Box 236 tests whether the edge is inactive. If not, we return to box 204 to check whether there are further edges to process.

Figure 5:
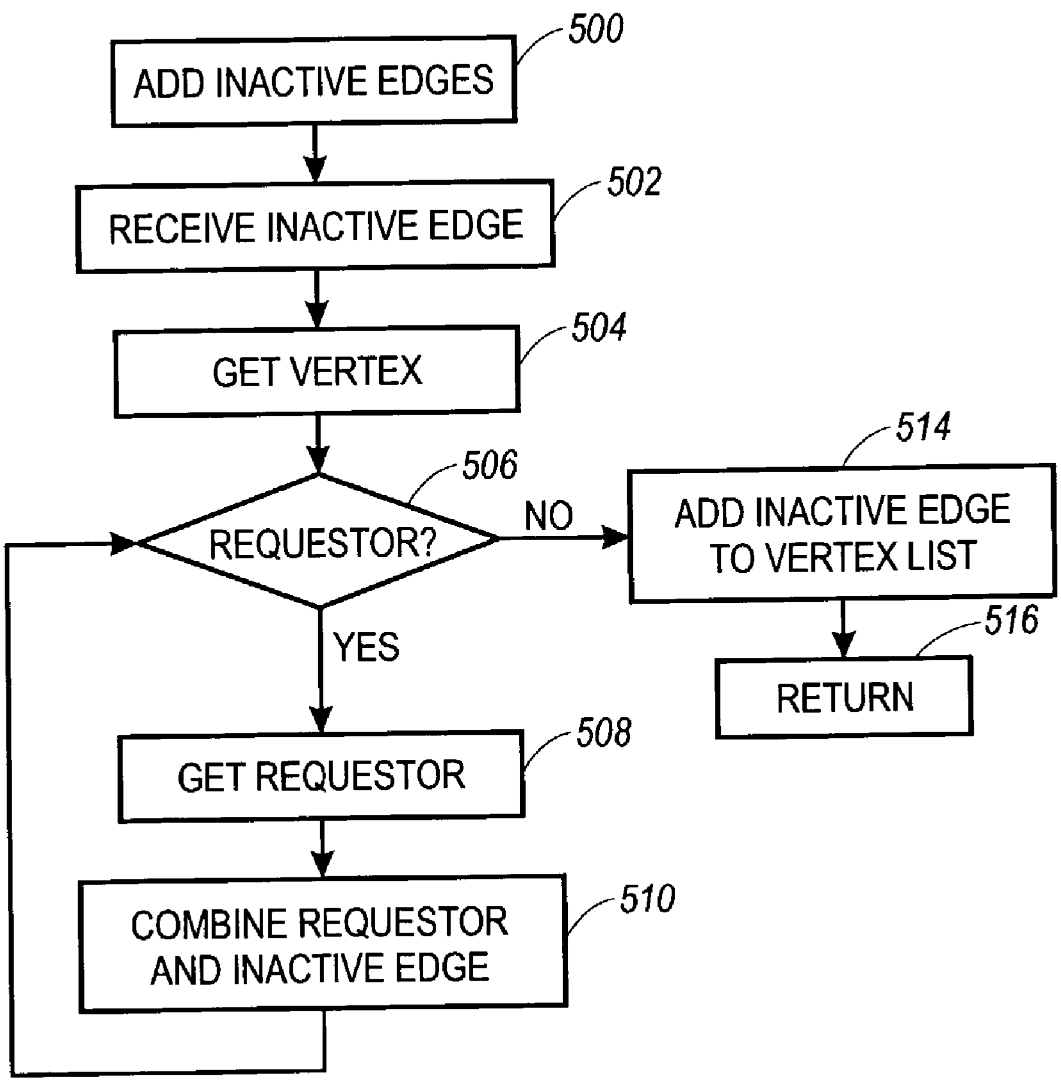
FIG. 5 is a flow chart showing the process of adding inactive edges according to the present invention.

If however, the test in box 236 returns that the edge is inactive, then the process ADD INACTIVE EDGE, described more fully in FIG. 5 is called. After returning from ADD INACTIVE EDGE, the process then returns to box 204 to check whether there are more edges to process. Once the process has returned to box 204 it repeats the steps with each of the additional edges to be processed in the same manner as with the first edge above.

If however, the check in box 208 produced that the edge is active, the process then checks to see if there are any arcs to be processed in box 210. An arc is a data structure that indicates how a partial rule can be added on to. If not, we go to box 236 and process through boxes 236 and 238 as described above before returning to box 204 to process and further edges.

If there is an arc to be processed, the first arc is retrieved in box 212. The first arc has a daughter category and constraints that indicate how the feature structure associated with the daughter category is related to the feature structure of the edge's category. For simplicity, we assume that the constraints are non-disjunctive.

The process then determines the possible feature structure identifiers for the arc's daughter category given the arc's constraints and the input to the generator in box 214. For instance, if the constraint was ($\wedge$ SUBJ)=! and the edge had the feature structure identifier f1 and the input had the constraint (f1 SUBJ)=f2, then f2 would be a possible feature structure identifier for the arc's daughter category.

Box 216 checks whether there is a feature structure identifier. If there is no identifier, then the process returns to box 210 check for further arcs to be processed. If so, the next arc is retrieved and processed as the first arc above.

If there is a possible feature structure identifier, box 218 gets the first possible feature structure identifier for the arc's daughter category. And BUILD GENERATION GUIDE then looks up the arc's daughter category and the feature structure identifier as a source edge in the guide in box 220. Box 222 then checks whether the source edge already exists in the guide.

If the source edge does not exist in the guide then a source edge is created consisting of the daughter's category and the feature structure identifier and it is added to the guide and the agenda in box 224. Once the source edge has been created then box 226 then calls FIND ENTRIES IN LEXICON, described in further detail in FIG. 3, with the daughter's category and the feature structure identifier to see if there are any words in the grammar that are consistent with this information. When FIND ENTRIES IN LEXICON is finished the procedure returns to box 228 and creates a requestor.

If the source edge does exist in the guide, the process goes from box 222 directly to box 228 to create a requestor. Box 228 creates a requestor consisting of the current edge and the arc. Once the requestor has been created then box [230] calls ADD REQUESTOR TO INACTIVE EDGES with the requestor and the source edge's vertex. A vertex is a data structure that contains just the category and the feature structure identifier of an edge. The process then returns to box 216 to check if there are further identifiers to process. If so the process proceeds to get the next feature structure identifier for the arc's daughter category, for each identifier and process as described above with the first identifier Moving on to FIG. 3, the procedure FIND ENTRIES IN LEXICON finds the entries in the lexicon that are consistent with the category and feature structure identifier received as parameters in box 302. Box 304 then enumerates the lexical entries that are consistent with the category and the constraints associated with the feature structure identifier and adds a new edge to the chart and the agenda. The enumeration can be done efficiently if the semantic facts associated with the lexical entry have already been added to a hash table. The enumeration will then be limited to the lexical entries that have the same semantics facts as the feature structure identified plus those lexical entries that don't have any semantic facts. The new edge has the given category and feature structure identifier. It also has a subtree whose daughter is the lexical entry and whose constraints are the constraints associated with the lexical entry. The new edge is added to the agenda so that it can be combined with active edges or source edges that are requestors of an edge like this. Box 306 returns from the procedure.

Figure 4:
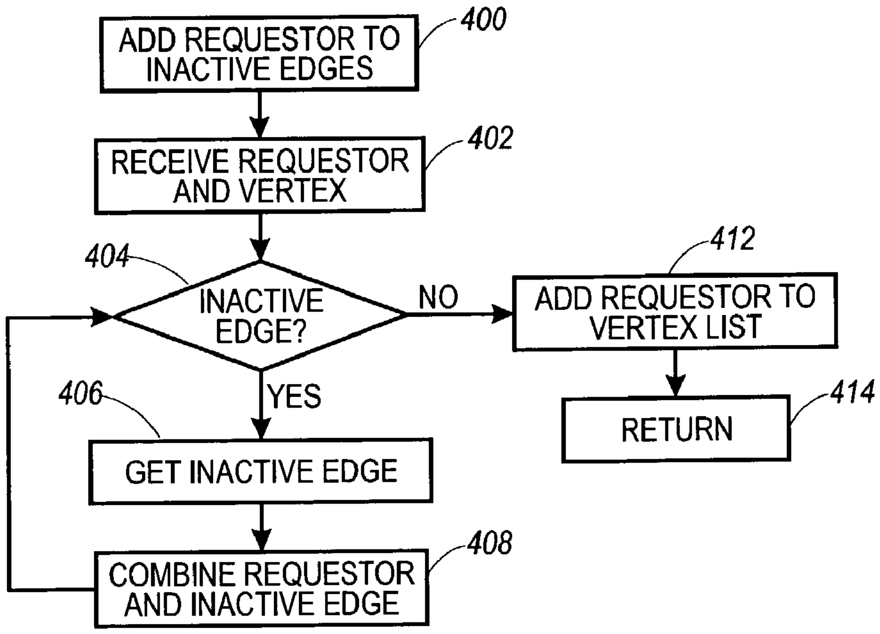
FIG. 4 is a flow chart showing the process of adding a requestor to inactive edges according to the present invention.

FIG. 4 shows the procedure ADD REQUESTOR TO INACTIVE EDGES. This procedure receives a requestor and a vertex in box 402 and then combines the requestor with any inactive edges associated with the vertex.

Box 404 checks whether there is an inactive edge. If there is an inactive edge box 404 gets the first inactive edge associated with the vertex. Once the first inactive edge is retrieved, box 408 calls COMBINE REQUESTOR AND INACTIVE EDGE described in more detail in FIG. 6, with the requestor and the inactive edge. The process then returns to box 404 to check if there are further inactive edges for processing and proceeds to process them as described for the first inactive edge for each of the remaining inactive edges.

If, however the check in box 404 determined that there is not an inactive edge, then the process proceeds to box 412. Box 412 adds the requestor to the vertex's list of requestors in case new inactive edges are added to the vertex later. After completing the add, the process returns in box 414.

The procedure ADD INACTIVE EDGE, described in FIG. 5 receives an inactive edge in box 502 and combines it with all of the requestors associated with its vertex. Box 504 gets the vertex for the edge and then proceeds to box 506 to checks whether there is a requestor. If there is a requestor then the process gets the first requestor for the vertex in box 508 and then proceeds to call COMBINE REQUESTOR AND INACTIVE EDGE in box 510, described more fully in FIG. 6. Upon completion of COMBINE REQUESTOR AND INACTIVE EDGE the process returns to box 506 to determine if there are further requestors for processing. If so, the process retrieves each requestor and processes them as described for the first requestor.

When the test in box 506 returns that there are no longer any requestors, the process proceeds to box 514 and adds the inactive edge to the inactive edges associated with the vertex in case new requestors are added to the vertex later. Once the inactive edge as been added, the process returns.

Figure 6:
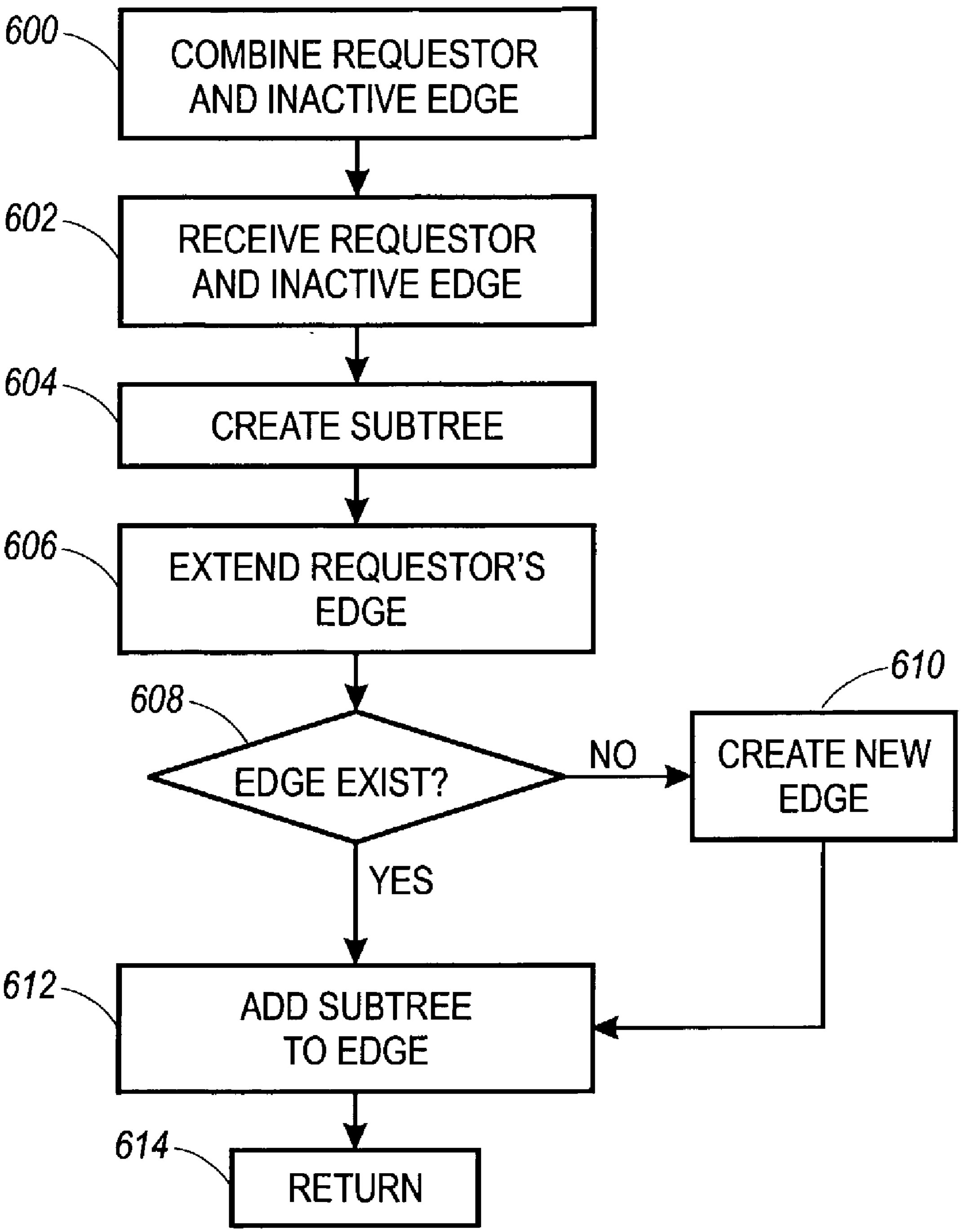
FIG. 6 is a flow chart showing the process of combining a requestor and inactive edge according to the present invention.

Procedure COMBINE REQUESTOR AND INACTIVE EDGE, shown in FIG. 6, combines a requestor and an inactive edge to produce a new edge. The procedure receives the requestor and the inactive edge in box 602. The process then proceeds to box 604 and creates a subtree made up of an active edge (the requestor's edge), an inactive edge, and the requestor's arc. Once the subtree has been created the process moves to box 606 and uses the arc to determine what sort of category is created when the active and inactive edge are combined and looks this category and the feature structure identifier of the requestor's edge up in the guide. Box 608 checks whether an edge with these properties already exists in the guide. If it does, the process proceeds to box 612. If an edge with these properties doesn't already exist then the process proceeds to box 610 where a new edge with these properties is created and added to the agenda for further processing and to the guide so that we know that it already exists before proceeding to box 612. In box 612, the process adds the subtree to the current edge and then returns in box 614.

Figure 7:
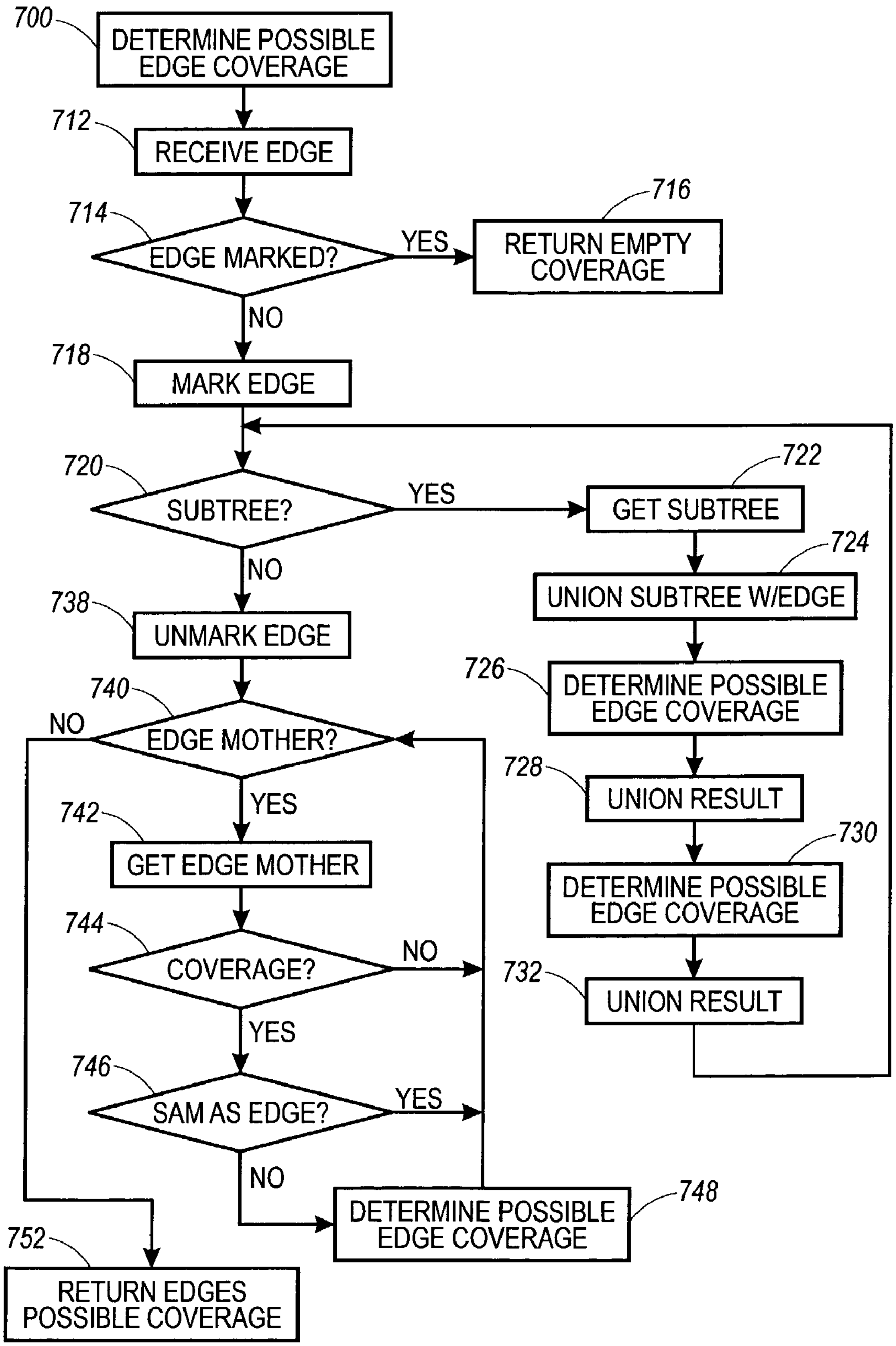
FIG. 7 is a flow chart showing the process of determining possible edge coverage according to the present invention.

Procedure DETERMINE POSSIBLE COVERAGE, shown in FIG. 7, determines the possible coverage for an edge received in box 712. When the edge has been received the process proceeds to box 714 which checks whether the edge is marked to indicate that it is being processed. This only happens if there is a cycle in the generation chart. If it is marked then we return empty coverage immediately in box 716. If the edge is not marked the process proceeds to box 718, where the edge is marked. After marking the edge, the process proceeds to box 720, which checks whether there is a subtree for processing.

If there is a subtree for processing, box 722 gets the first subtree of the edge and the process continues by creating the union of the coverage of the subtree's constraints with the edge's possible coverage in box 724. Once the union has been performed then the process proceeds to call itself, DETERMINE POSSIBLE EDGE COVERAGE, with the subtree's active edge in box 726 to determine the possible coverage of the subtree's active edge. Once coverage of the subtree's active edge has been determined the process continues in box 728 which unions the result with the edge's possible coverage. After the union has been performed the process then moves to box 730 where the process again calls itself, DETERMINE POSSIBLE EDGE COVERAGE, with the subtree's inactive edge and determines the possible coverage of the subtree's inactive edge. After the possible coverage of the subtree's inactive edge has been determined the process then moves to box 732 which unions the result with the edge's possible coverage. The process then returns to box 720 where it determines if there are any further subtrees for processing. If they are, they are each retrieved and processed in the same manner as the first subtree.

If the decision in box 720 determines that there is no subtrees for processing, the process proceeds to box 738 which unmarks the edge. Once the edge has been unmarked the process moves to box 740 checks whether there is a mother of the edge. If there is a mother of the edge, the process then gets the first mother of the edge in box 742. Once the first mother has been retrieved the process moves to box 744 to check whether the mother has coverage already.

If the mother doesn't have coverage already the process returns to box 740 to check if there are other mother's to be processed and processes them using the same sequence to process the first mother. If the mother already has coverage the process checks whether the mother's possible coverage is the same as the edge's possible coverage in box 746. If the mother's possible coverage is the same as the edge's possible coverage the process returns to box 740 to check if there are other mother's to be processed and processes them using the same sequence to process the first mother. If the mother's possible coverage is not the same as the edge's possible coverage the process calls itself, DETERMINE POSSIBLE EDGE COVERAGE with the mother in box 748. This is necessary to correctly compute the possible coverage of edges that are in a cycle. When this process call of DETERMINE POSSIBLE EDGE COVERAGE with the mother is completed the process returns to box 740 to check if there are other mother's to be processed and processes them using the same sequence to process the first mother.

When the process step in box 740 determines that there are no more edge mothers to be processed the process moves to box 752 and returns the edge's possible coverage.

Figure 8:
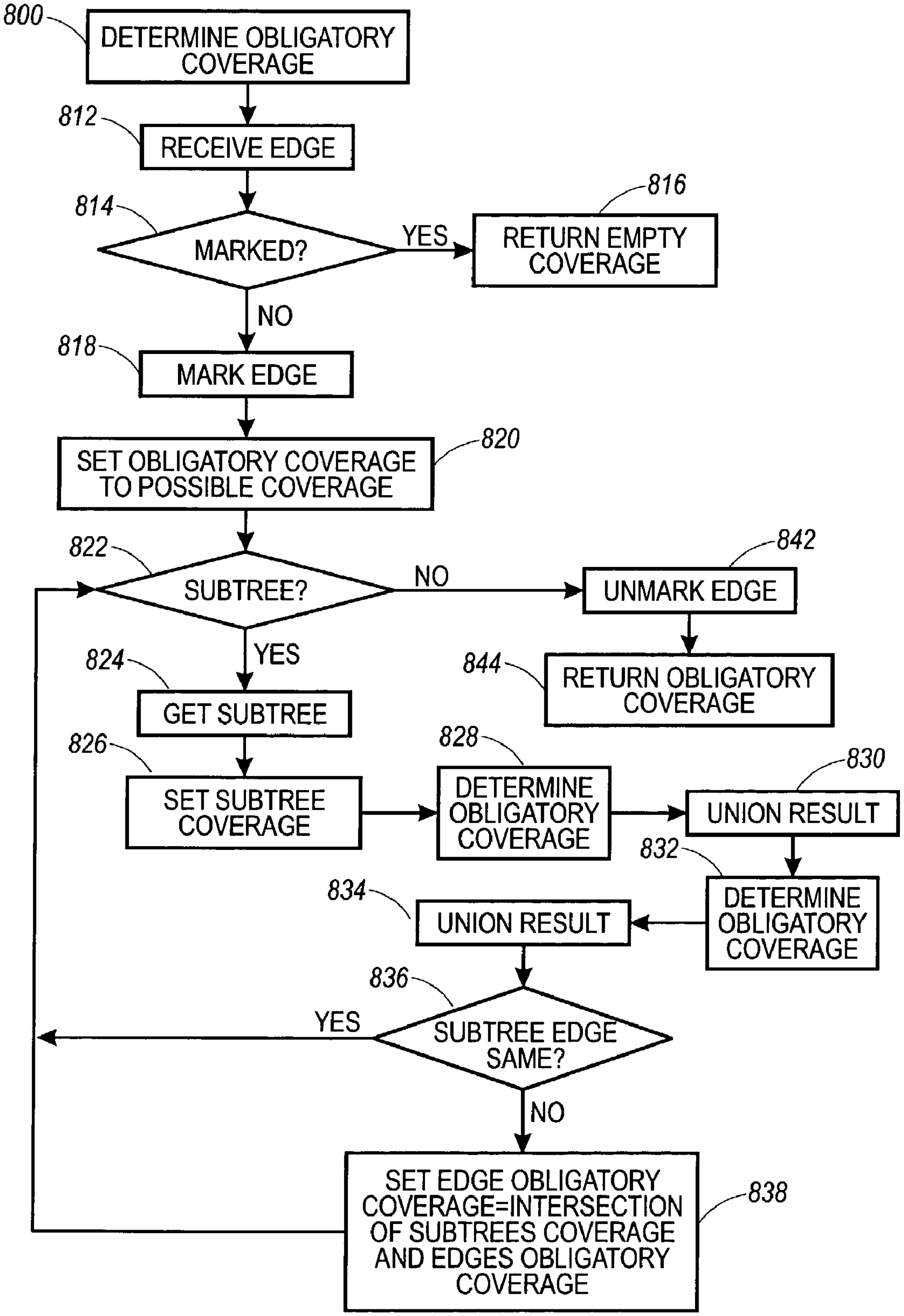
FIG. 8 is a flow chart showing the process of determining obligatory coverage according to the present invention.

Procedure DETERMINE OBLIGATORY COVERAGE, shown in FIG. 8, determines the obligatory coverage of an edge. In box 812 the process receives the edge. The process then moves to box 814 where it checks whether the edge is marked to indicate that we are in a cycle. If the edge is marked the process immediately moves to box 816 where the process returns empty coverage. If the edge is not marked the process instead moves to box 818 and marks the. After marking the edge the process proceeds to box 820 where the process initializes the edge's obligatory coverage to its possible coverage. After initializing the coverage the process then moves to box 822 and checks whether there is a subtree.

If the check in 822 returns that there is no subtree, the process then moves to box 842 which unmarks the edge. After unmarking the edge the process moves to box 844 which returns the edge's obligatory coverage.

However, if the check in box 822 returns that there is a subtree the process moves to box 824 and gets the first subtree of the edge. After retrieving the first subtree the process moves to box 826 and sets the subtree's coverage to the coverage of the subtree's constraints. After setting the coverage, the process then calls itself, DETERMINE OBLIGATORY COVERAGE with the subtree's active edge, in box 828 and determines the obligatory coverage of the subtree's active edge. Once the obligatory coverage of the subtree's active edge has been determined the process moves to box 830 which unions the result with the subtree's coverage. After the union has been completed the process moves to box 832, which again calls itself DETERMINE OBLIGATORY COVERAGE with the subtree's inactive edge, and determines the obligatory coverage of the subtree's inactive edge. After determining the coverage of the subtree's inactive edge the process moves to box 834 which unions the result with the subtree's coverage. After the union has been completed the process moves to box 836 which checks whether the subtree's active edge or the subtree's inactive edge are the same as the edge, indicating a very tight cycle. If yes, we skip the subtree by returning to box 822 to determine if there are any more subtrees. If there are they are retrieved and processed in the same manner as the first subtree.

If in box 836 neither the subtree's active edge or the subtree's inactive edge are the same as the edge, we set the edge's obligatory coverage to the intersection of the subtree's coverage and the edge's current obligatory coverage in box 838. This often will make the edge's obligatory coverage smaller. The process then proceeds by returning to box 822 to determine if there are any more subtrees. If there are they are retrieved and processed in the same manner as the first subtree.

Figure 9:
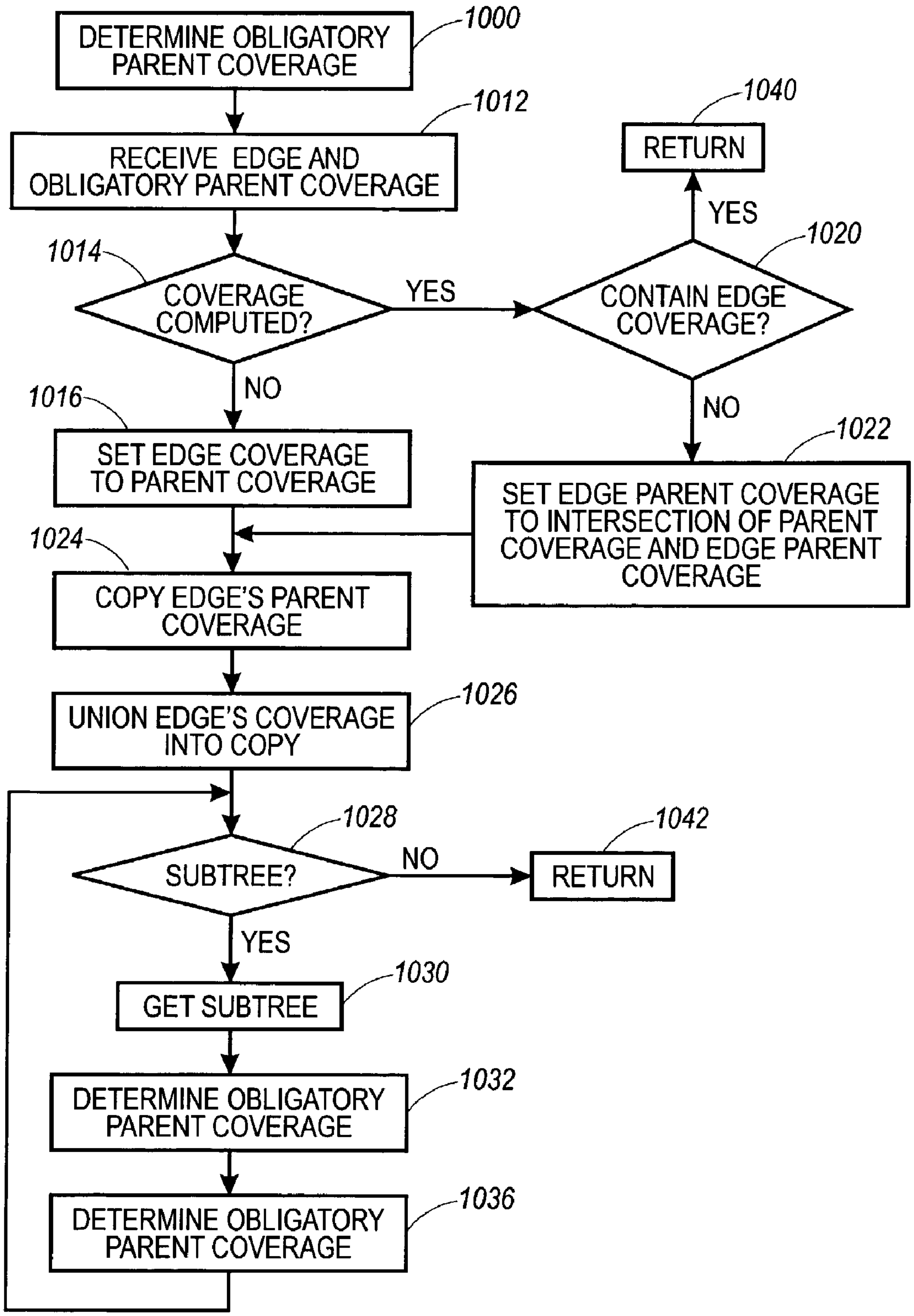
FIG. 9 is a flow chart showing the process of determining obligatory parent coverage according to the present invention.

Procedure DETERMINE OBLIGATORY PARENT COVERAGE, shown in FIG. 9 determines the obligatory parent coverage for an edge. Box 1012 receives an edge and obligatory parent coverage and moves to box 1014. Box 1014 checks whether the obligatory parent coverage for the edge has already been computed. If the obligatory parent coverage has been computed the process moves to box 1020. Box 1020 checks whether the obligatory parent coverage given contains the edge's obligatory parent coverage, if so, the process moves to box 1040 and returns. If the obligatory parent coverage given does not contain the edge's obligatory parent coverage the process moves to box 1022 where the process sets the edge's obligatory parent coverage to the intersection of the obligatory parent coverage and the edge's obligatory parent coverage.

If box 1014 determined that the obligatory parent coverage has not been computed, the process then moves to box 1016 where the process sets the edge's obligatory parent coverage to a copy of the obligatory parent coverage that was received earlier in box 1014 and the process moves to box 1024. In box 1024 the process copies the edge's obligatory parent coverage before moving to box 1026. In box 1026 the process unions the edge's obligatory coverage with the copy. The copy now contains the obligatory parent coverage for the edges below this edge. The process then proceeds to box 1028 where the process checks whether there is a subtree. If there is no subtree the process then moves to box 1042 where it returns.

However, if the check in box 1028 determines there is a subtree, the process gets the first subtree of the edge in box 1030. When the subtree has been retrieved the process calls itself, DETERMINE OBLIGATORY PARENT COVERAGE with the subtree's active edge and the copied coverage in box 1032. When this step has been finished the process then moves to box 1036 where it then calls itself, DETERMINE OBLIGATORY PARENT COVERAGE with the subtree's inactive edge and the copied coverage. The steps in these two boxes 1032, 1036 propagate the obligatory parent coverage down. Once the obligatory parent coverage has been propagated down in boxes 1032 and 1036 the process returns to box 1028 where it check's if there are further subtrees. If there are further subtrees the process then retrieves each subtree and processes them as it did for the first subtree.

Figure 10:
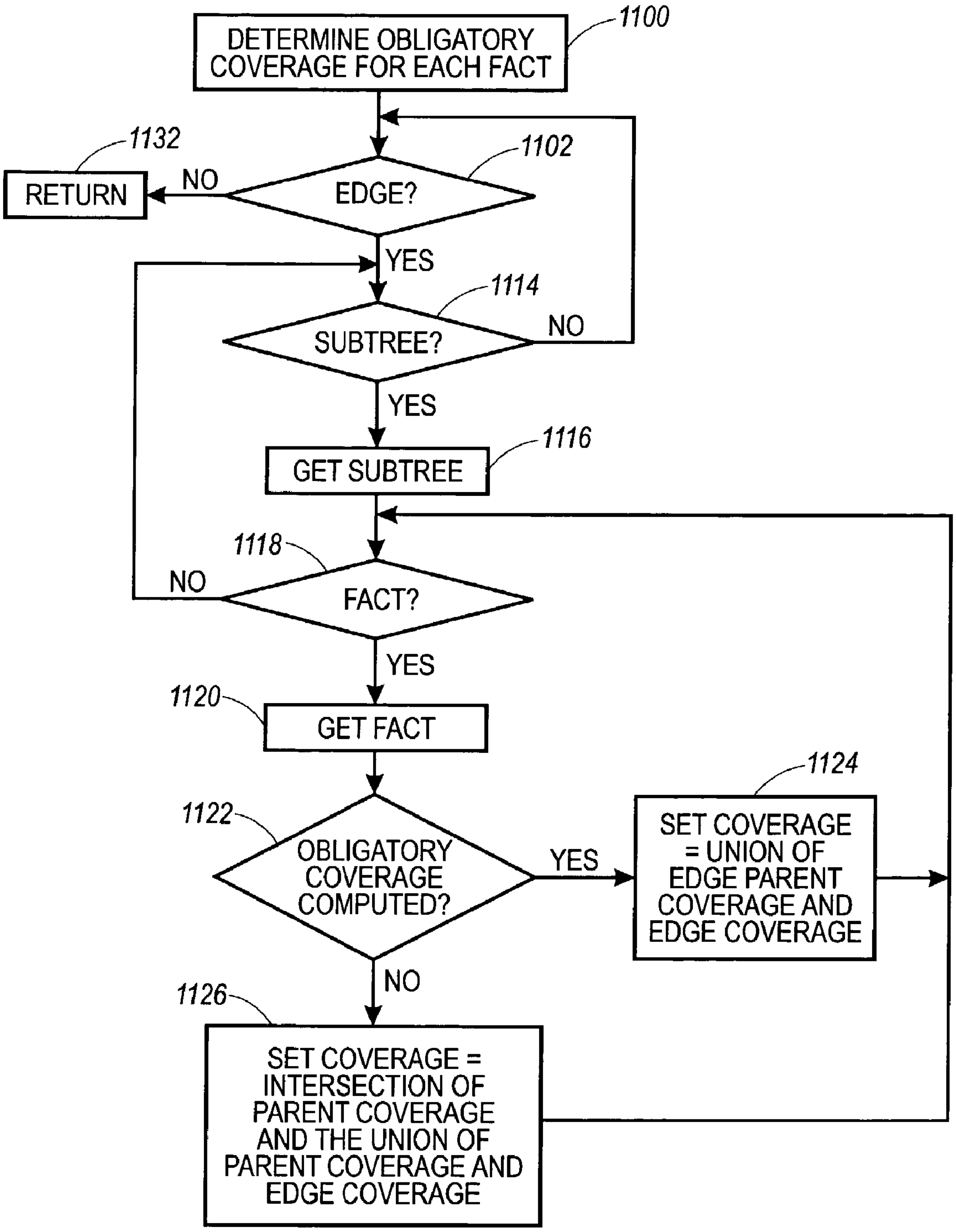
FIG. 10 is a flow chart showing the process of determining obligatory coverage for each fact according to the present invention.

Procedure DETERMINE OBLIGATORY PARENT COVERAGE FOR EACH FACT, shown in FIG. 10, determines the obligatory parent coverage for each fact by intersecting the edge's obligatory parent coverage with the obligatory parent coverage of any facts in the constraints of the edge's subtrees. The procedure first determines if there are any edges in box 1102. If there are no edges the procedure returns in box 1132. If there are edges, the procedure moves to box 1114 and checks whether there is a subtree in the first edge. If there is no subtree, the procedure returns to box 1102 and checks whether there are further edges to be processed and processes each edge as it processed the first edge.

If there is a subtree then the process moves to box 116 where it gets the first subtree of the edge. The process then moves to box 1118 where whether there is a fact. If there is no fact the process returns to box 1114 to check if there are further subtrees. If there are the process then retrieves each subtree and processes them in the same manner as the first subtree.

If there is a fact, the process moves to box 1120 and gets the first fact in the subtree's constraints. After retrieving the first fact the process checks whether the obligatory parent coverage for this fact has already been computed in box 1122. If the obligatory parent coverage for this fact has already been computed, the process moves to box 1126 which sets the obligatory parent coverage for this fact to the intersection of the current obligatory parent coverage and the union of the edge's obligatory parent coverage and the edge's obligatory coverage.

If the obligatory parent coverage for this fact has not already been computed, the process sets the obligatory parent coverage for this fact to the union of the edge's obligatory parent coverage and the edge's obligatory coverage in box 1124.

After setting the coverage in either box 1124 or box 1126 the process returns to box 1118 to determine if there are any further facts to process. If there are, the process then retrieves each fact and processes them as it did the first fact. When all the facts, subtrees and edges have been processed the process returns in box 1132.

Figure 11:
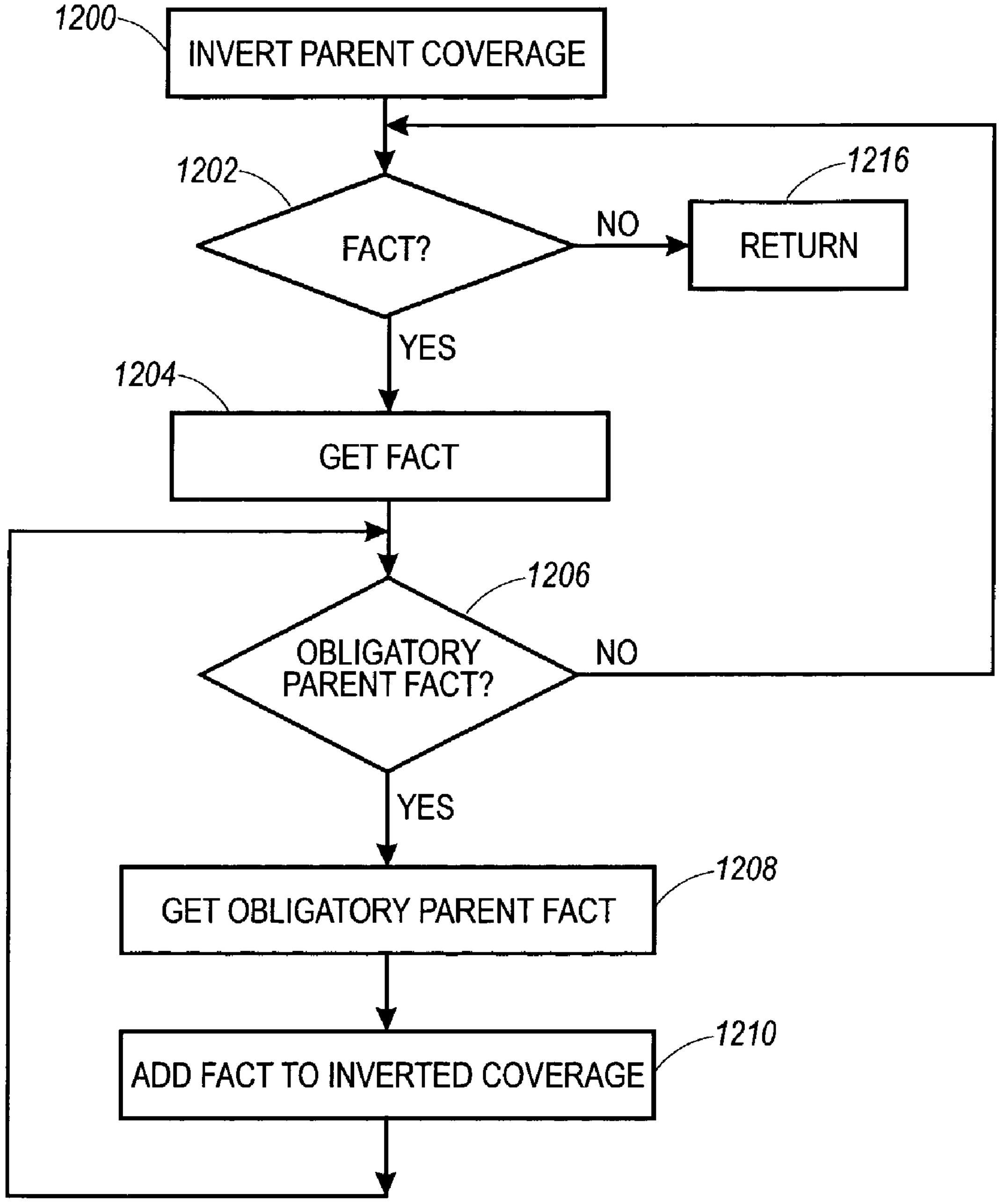
FIG. 11 is a flow chart showing the process of inverting parent coverage according to the present invention.

Procedure INVERT PARENT COVERAGE FOR EACH FACT, shown in FIG. 11 inverts the parent coverage for each fact. After entering the procedure in box 1200, the procedure moves to box 1202 and checks if there are any facts. If there are no facts to be processed the procedure moves to box 1216 and returns.

If there are facts to be processed the procedure moves to box 1204 and gets the first fact. After getting the first fact the procedure checks whether there is an obligatory parent fact in box 1206. If there is no obligatory parent fact the procedure returns to box 1202 to check for further facts. If there are further facts, the procedure retrieves each one in turn and processes it the same as the first fact.

If the check in box 1206 determined there was an obligatory parent fact the procedure then get the fact's first obligatory parent fact in box 1208. After retrieving the obligatory first parent fact the procedure then adds the fact to the inverted obligatory parent coverage of the obligatory parent fact in box 1210. The procedure then returns to box 1206 to determine if there are further obligatory parent facts. If there are the procedure then retrieves each obligatory parent fact and processes it as it did the first obligatory parent fact. When all of the obligatory parent facts and all the facts have been processed the procedure then returns in box 1216.

Figure 12:
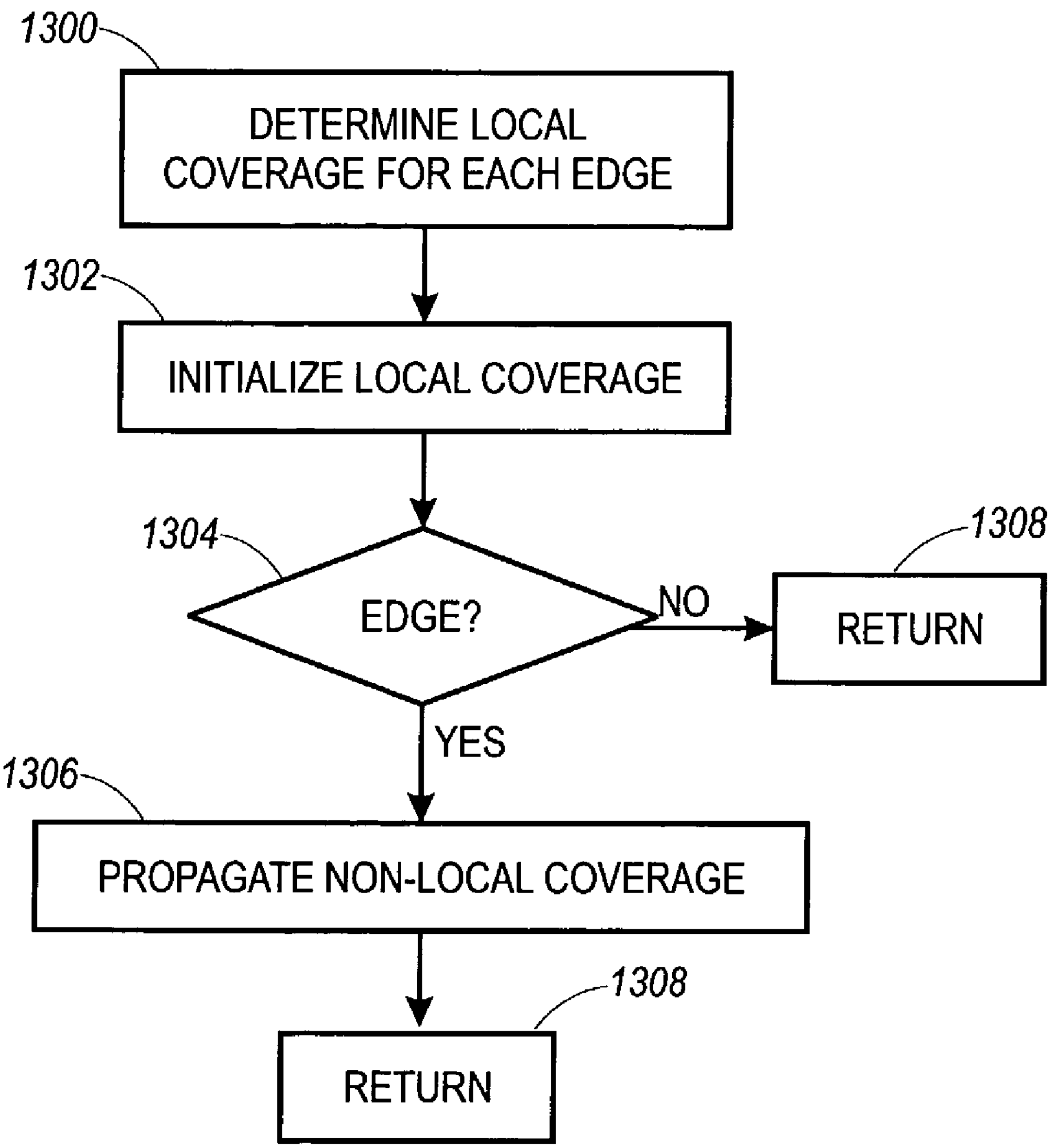
FIG. 12 is a flow chart showing the process of determining local coverage for each edge according to the present invention.

Procedure DETERMINE LOCAL COVERAGE FOR EACH EDGE in FIG. 12 determines the local coverage for each edge in the generation guide. After entering the procedure in box 1300, the procedure moves to box 1302 where it initializes the local coverage for each edge in the guide to be the edge's possible coverage. Box 1304 determines if there are edges in the guide to be processed. If there are no edges to be processed the procedure returns in box 1308. However, if there are edges to be processed the procedure enumerates all of the edges to be processed in the guide and moves to box 1306 which calls PROPOGATE NON-LOCAL COVERAGE for each edge with the non-local coverage initialized to empty coverage. When PROPOGATE NON-LOCAL COVERAGE has completed for each of the edges the process returns in box 1308.

Figure 13:
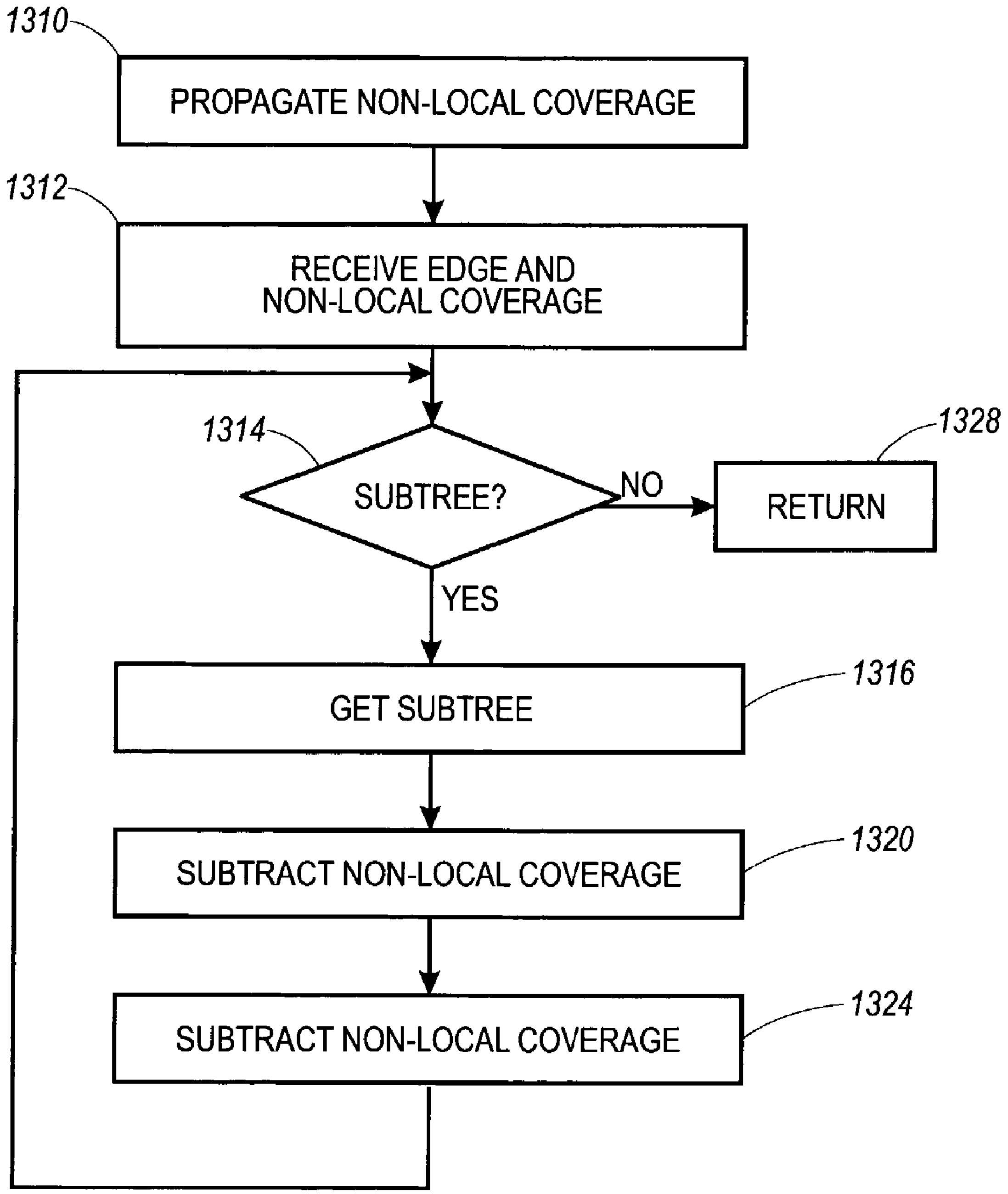
FIG. 13 is a flow chart showing the process of propagating non-local coverage according to the present invention.

Procedure PROPOGATE NON-LOCAL COVERAGE, also shown in FIG. 13, propagates non-local coverage down an edge. After entering the procedure in box 1310, the procedure moves to box 1312 where it receives an edge and the non-local coverage for the edge. After receiving the edge and the non-local coverage the procedure moves to box 1314 checks whether there is a subtree to be processed. If there is no subtree the process returns in box 1328. If there is a subtree then the process gets the edge's first subtree in box 1316.

Figure 14:
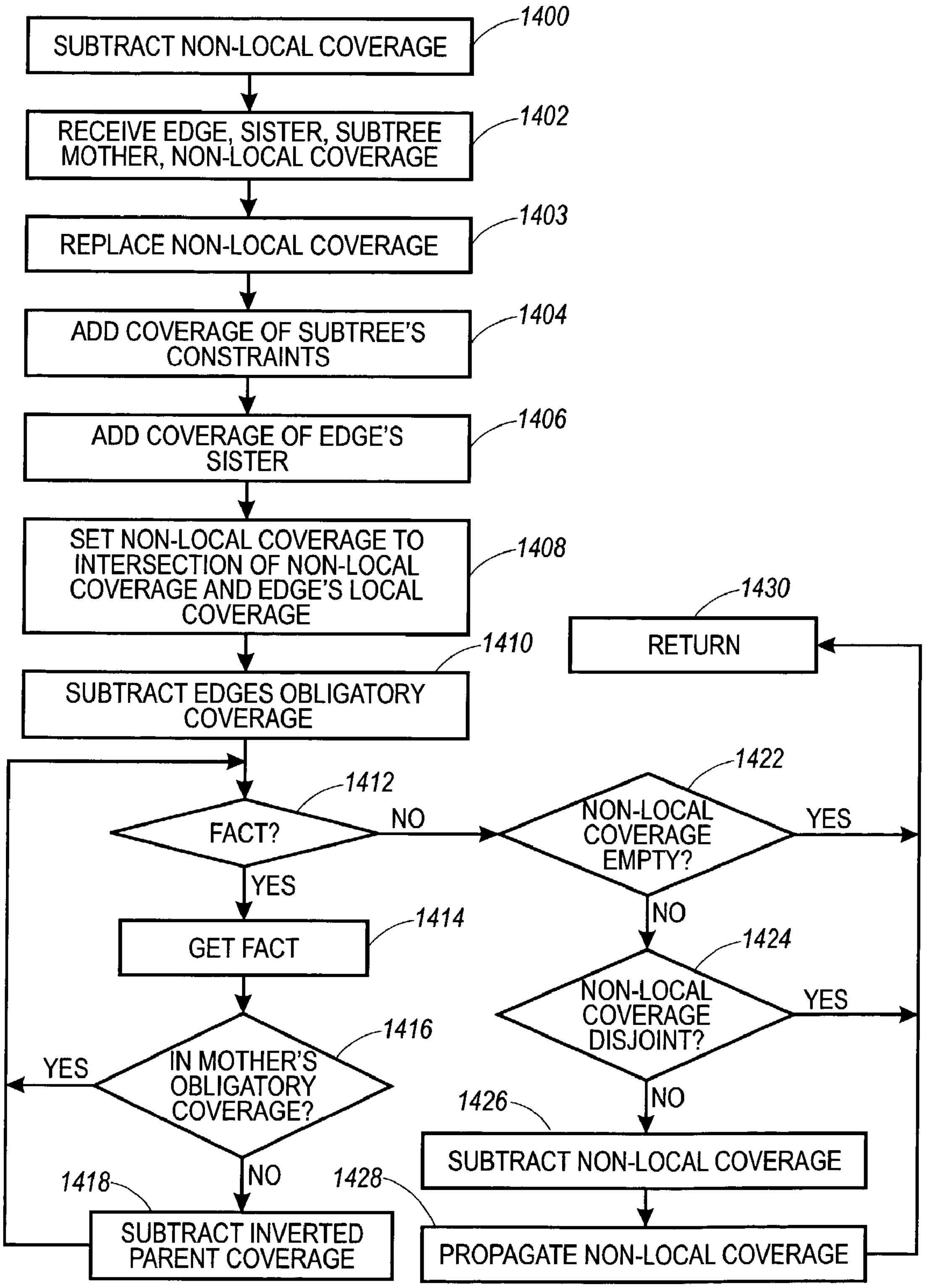
FIG. 14 is a flow chart showing the process of subtracting non-local coverage according to the present invention.
Figure 15:
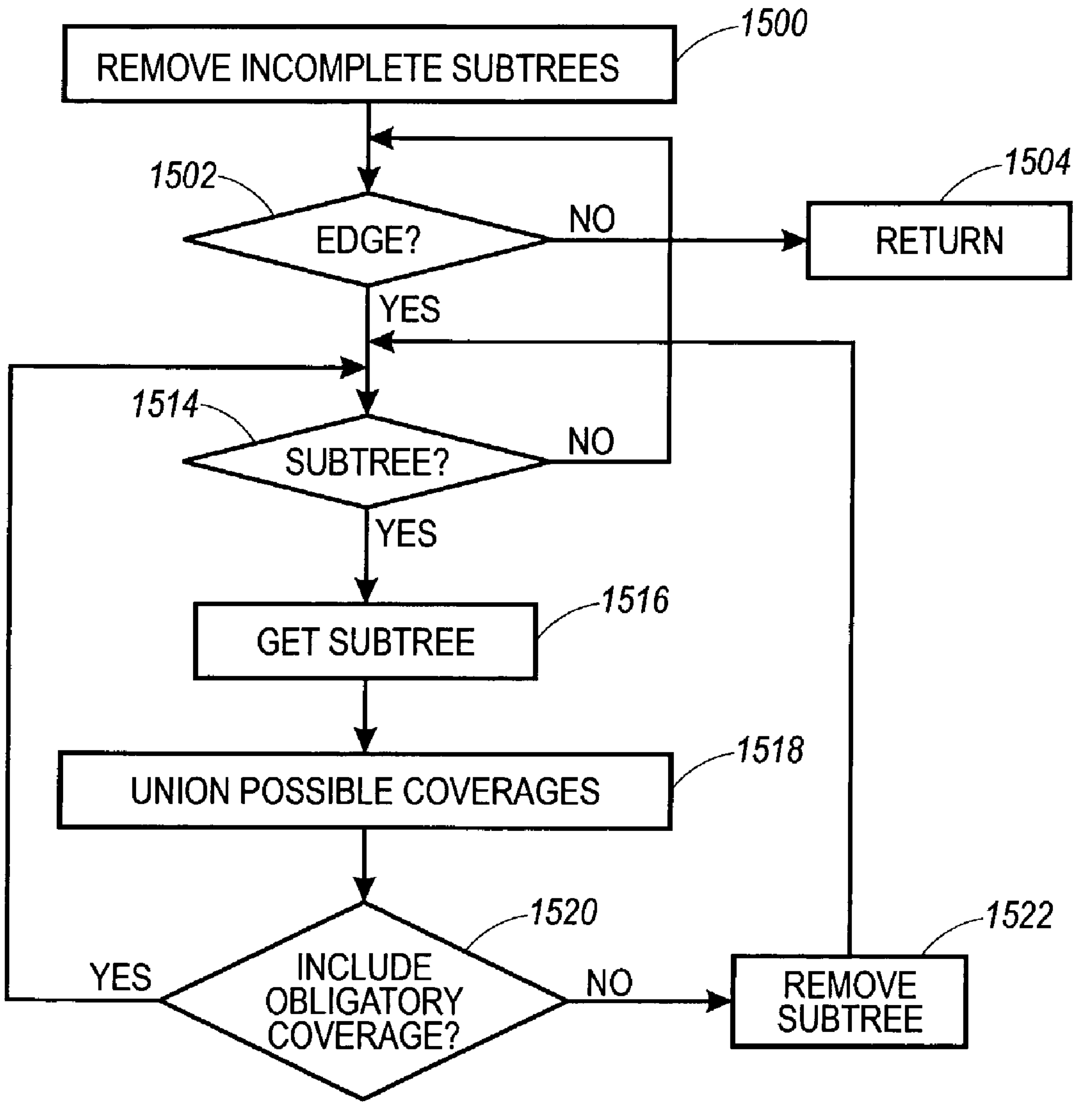
FIG. 15 is a flow chart showing the process of removing incomplete subtrees according to the present invention.

When the first subtree is retrieved the process then calls the procedure SUBTRACT NON-LOCAL COVERAGE, shown in FIG. 14, with the subtree's inactive edge, the subtree's active edge, the subtree, the edge, and the copy of the non-local coverage in box 1320. After returning from SUBTRACT NON-LOCAL COVERAGE the procedure then moves to box 1324 which calls SUBTRACT NON-LOCAL COVERAGE again but with the subtree's active edge, the subtree's inactive edge, the subtree, the edge, and the copy of the non-local coverage. Note, that in the procedure calls in boxes 1320 and 1324 the order of the active and inactive edges are swapped. This is so that the call in box 1320 will subtract the non-local coverage from a particular edge while the call in box 1324 will subtract the non-local coverage from the edge's sister. The process then returns to box 1314 to determine if there are further subtrees for processing. If there are, the process continues by getting each subtree and processing it as it did the first subtree. When all the subtrees have been processed the process returns in box 1328.

Procedure SUBTRACT NON-LOCAL COVERAGE, shown in FIG. 14 subtracts the non-local coverage from an edge. After entering the procedure in box 1400, the procedure moves to box 1402 were it receives an edge, the edge's sister, a subtree, the edge's mother, and non-local coverage for the edge. The edge's sister, the subtree's constraints, the edge's mother, and the non-local coverage are all non-local to the edge. The process then moves to Box 1403 where it replaces the non-local coverage with a copy of itself to avoid cross-talk between different callers before moving on to box 1404. In box 1404 the process adds the coverage of the subtree's constraints to the non-local coverage. The process then proceeds to box 1406, which adds the coverage of the edge's sister to the non-local coverage. After adding the coverage of the edge's sister the process moves to box 1408 and sets the non-local coverage to the intersection of the non-local coverage and the edge's current local coverage. After setting the non-local coverage the process moves to box 1410 which subtracts the edge's obligatory coverage from the non-local coverage. Box 1412 checks whether there are facts to be processed. If there are facts to be processed gets the first fact in the edge's obligatory coverage in box 1414. After getting the first fact the process moves to box 1416 and checks whether the fact is in the mother's obligatory coverage. If the fact is in the mother's obligatory coverage the process returns to box 1412 and determines if there are further facts to be processed. If there are, the process retrieves each one in turn and processes them the same as the first fact.

If the check in box 1416 determines that the fact is not in the mother's obligatory coverage the process moves to box 1418 and subtracts the inverted obligatory parent coverage of the current fact from the non-local coverage. Once the subtraction has been completed the process returns to box 1412 and determines if there are further facts to be processed. If there are, the process retrieves each one in turn and processes them the same as the first fact.

When all the facts have been processed or if the initial check in box 1412 says there are no facts the process moves to box 1422. Box 1422 checks whether the non-local coverage is empty. If the non-local coverage is empty, the process returns in box 1430. If the non-local coverage is not empty, the process checks whether the non-local coverage is disjoint from the edge's current local coverage in box 1424. If the non-local coverage is disjoint, the process returns in box [1430]. If the non-local coverage is not disjoint, the process then subtracts the non-local coverage from the edge's local coverage in box 1426. The process then moves to box 1428 where the process calls PROPOGATE NON-LOCAL COVERAGE, shown in FIG. 13, with the edge and the non-local coverage to propagate the new non-local coverage down. After propagating the non-local coverage the process returns in Box 1430.

Procedure REMOVE INCOMPLETE SUBTREES removes incomplete subtrees from the generation guide by enumerating the edges in the generation guide and calling removing incomplete subtrees with each edge.

After entering the procedure in box 1500, the process moves to 1502 and determines if there are any edges to be processed. If there are no edges the process returns in box 1504. If there are edges to be processed the procedure selects the first edge and moves to box 1514 where it checks whether there is a subtree.

If there is no subtree the process returns to box 1502 where it determines if there are any more edges to be processed. If there are more edges to be processed the process gets the next edge and processes it as it did the first edge. If there are no more edges to be processed the process returns in box 1504.

If there is a subtree box 1516 the process gets the first subtree in the edge. After retrieving the first subtree the process moves to box 1518 where it unions the possible coverage of the subtree's active edge, the subtree's inactive edge, and the subtree's constraints. After the union is computed the process moves to box 1520 where it checks whether the edge's obligatory coverage is included in the unioned possible coverage. If the edge's obligatory coverage is included in the unioned possible coverage then the process returns to box 1514 where it determines if there are further subtrees to be processed. If there are further subtrees the process retrieves the next subtree and processes it as it did the first subtree.

If the edge's obligatory coverage is not included in the unioned possible coverage, the subtree can never produce a complete solution, so we remove the subtree from the edge in box 1522. After removal of the subtree, the process returns to box 1514 where it determines if there are further subtrees to be processed. If there are further subtrees the process retrieves the next subtree and processes it as it did the first subtree. When all the subtrees for that edge have been processed the process returns to box 1502 where it determines if there are further edges to be processed. If there are more edges to be processed the process gets the next edge and processes it as it did the first edge. If there are no more edges to be processed the process returns in box 1504.

Figure 16:
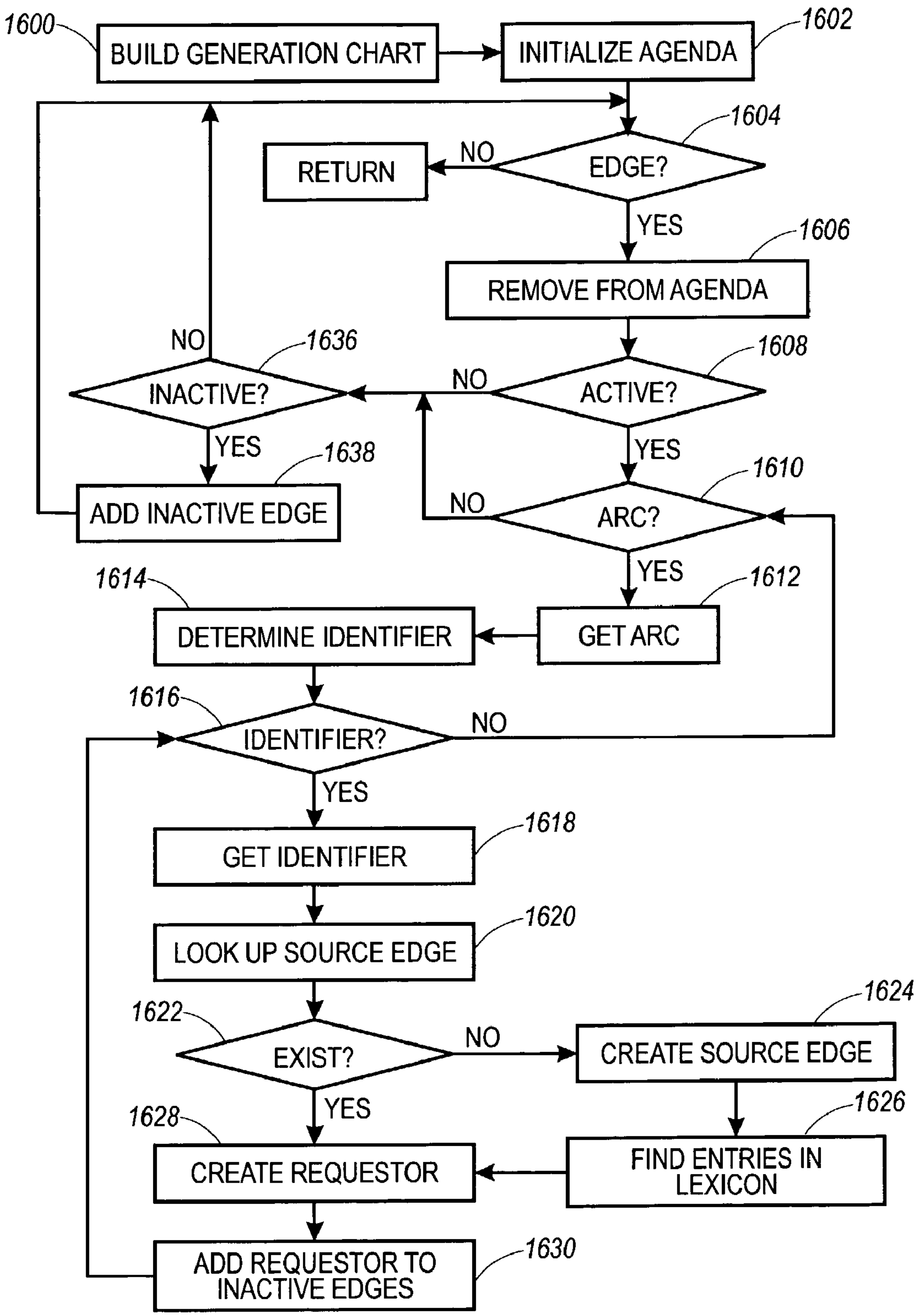
FIG. 16 is a flow chart showing the process of building a generation chart according to the present invention.
Figure 17:
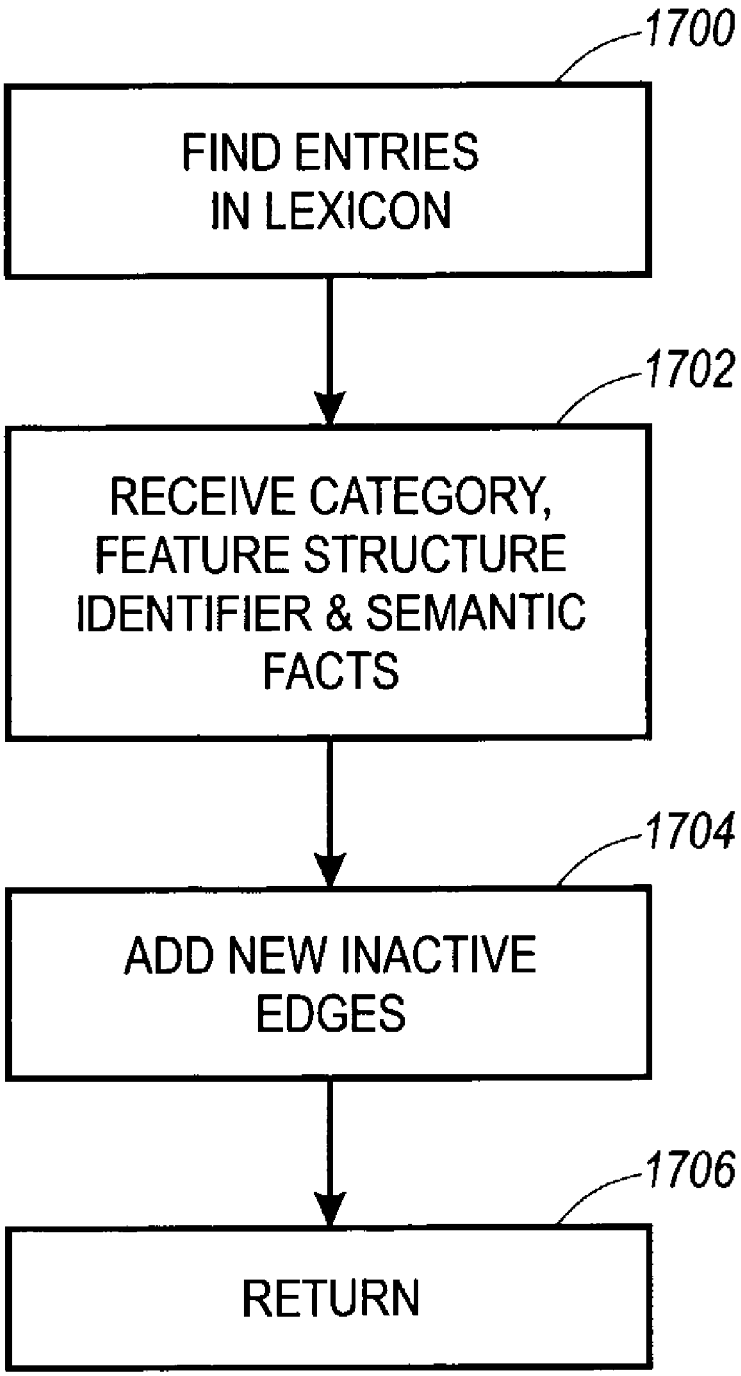
FIG. 17 is a flow chart showing an alternative process for finding entries in the lexicon according to the present invention.
Figure 18:
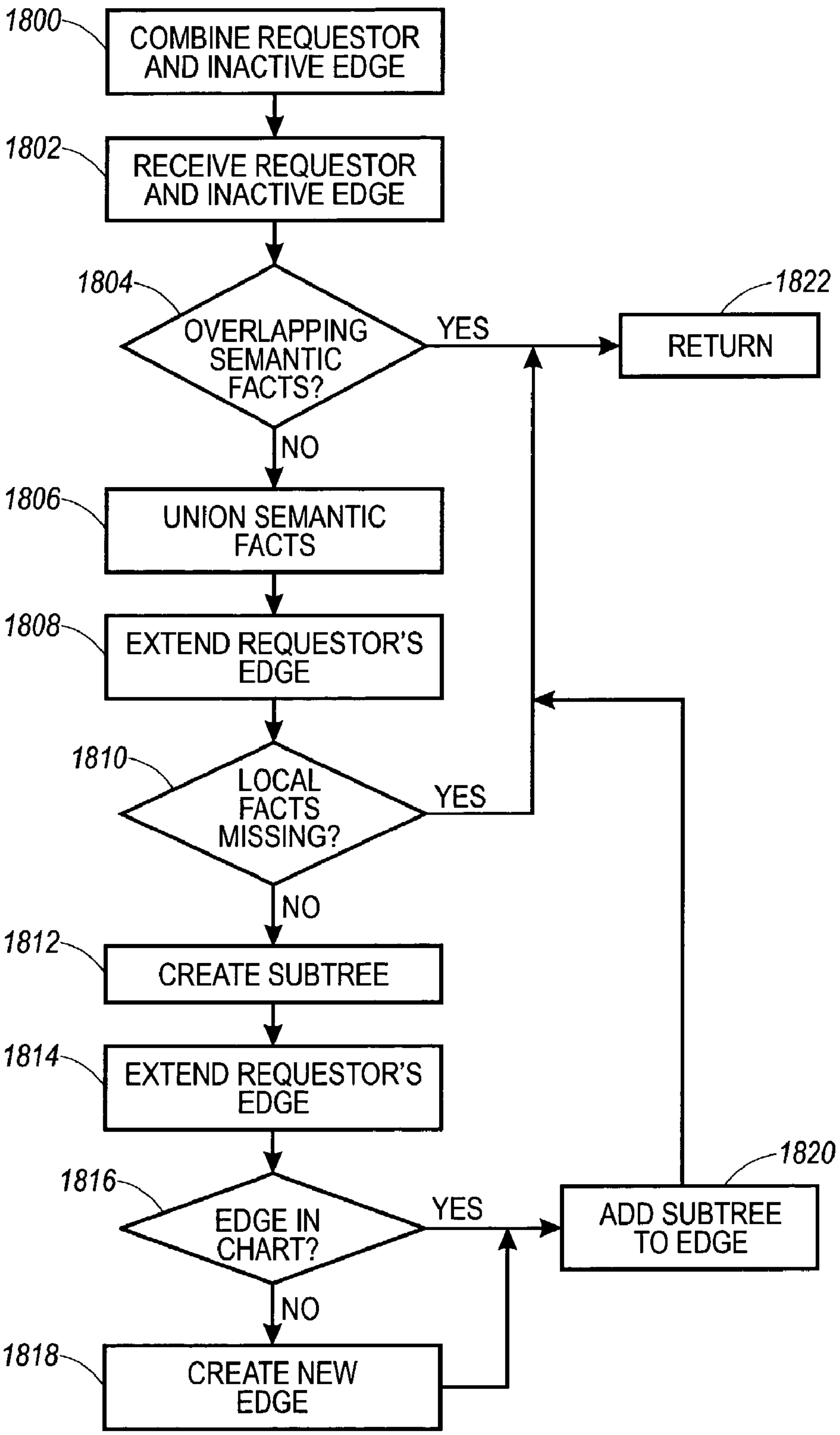
FIG. 18 is a flow chart showing an alternative process for combining a requestor and inactive edge according to the present invention.
Figure 19:
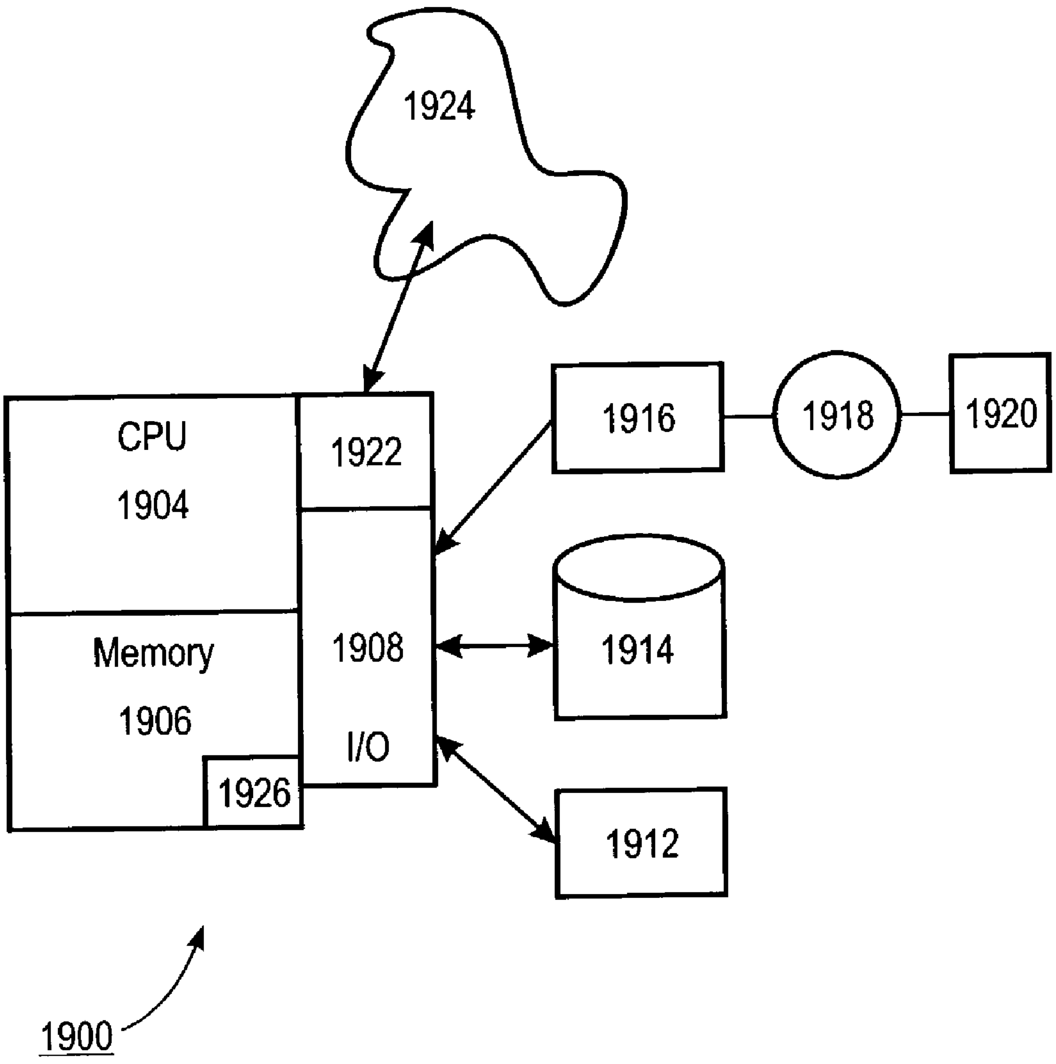
FIG. 19 is an illustration of a computer system used to implement the present invention.

Procedure BUILD A GENERATION CHART, shown in FIG. 16 builds a generation chart the same way that the generation guide was built except that procedure FIND ENTRIES IN LEXICON shown in 3 is replaced with a new procedure FIND ENTRIES IN LEXICON shown in FIG. 17 and procedure COMBINE REQUESTOR AND INACTIVE EDGE shown in FIG. 6 is replaced with a new procedure COMBINE REQUESTOR AND INACTIVE EDGE shown in FIG. 18.

After entering the procedure in box 1600, the process moves to box 1602 which initializes the agenda with a special type of edge called a source edge that has a root category of the grammar and the root feature structure identifier of the input. A source edge is effectively a request to build an edge with certain properties. The source edge in this case is a request to build an edge that has the root category of the grammar (usually S for sentence) and that has the root feature structure identifier of the input. Box 1604 checks whether or not there are any edges on the agenda needing to be processed. If not, we return from BUILD GENERATION CHART to GENERATE.

If there are edges needing to be processed we remove the first edge from the agenda in box 1606 and check whether the edge is active in box 1608. An edge is active if it represents a partial rule. Source edges are active edges. If the edge is not active, then we go to box 1636. Box 1636 tests whether the edge is inactive. If not, we return to box 1604 to check whether there are further edges to process. If there are further edges to process they are selected in turn and processed using the same procedures used with the first edge. If however, the test in box 1636 returns that the edge is inactive, then the process ADD INACTIVE EDGE in box 1638, described more fully in FIG. 5, is called. It should be noted that in this instance, when ADD REQUESTOR TO INACTIVE EDGES, is called that box 510 in ADD INACTIVE EDGE which calls COMBINE REQUESTOR AND INACTIVE EDGE should use the description of COMBINE REQUESTOR AND INACTIVE EDGE with respect to FIG. 18 and not the description with respect to FIG. 6 as used earlier.

After returning from ADD INACTIVE EDGE, the process then returns to box 1604 to check whether there are more edges to process. Once the process has returned to box 1604 it repeats the steps with each of the additional edges to be processed in the same manner as with the first edge above.

If however, the check in box 1608 produced that the edge is active, the process then checks to see if there are any arcs to be processed in box 1610. An arc is a data structure that indicates how a partial rule can be added on to. If not, we go to box 1636 and process through boxes 1636 and 1638 as described above before returning to box 1604 to process and further edges.

If there is an arc to be processed, the first arc is retrieved in box 1612. The first arc has a daughter category and constraints that indicate how the feature structure associated with the daughter category is related to the feature structure of the edge's category. For simplicity, we assume that the constraints are non-disjunctive.

The process then determines the possible feature structure identifiers for the arc's daughter category given the arc's constraints and the input to the generator in box 1614. For instance, if the constraint was ($\wedge$ SUBJ)=! and the edge had the feature structure identifier f1 and the input had the constraint (f1 SUBJ)=f2, then f2 would be a possible feature structure identifier for the arc's daughter category.

Box 1616 checks whether there is a feature structure identifier. If there is no identifier, then the process returns to box 1610 check for further arcs to be processed. If so, the next arc is retrieved and processed as the first arc above.

If there is a possible feature structure identifier, box 1618 gets the first possible feature structure identifier for the arc's daughter category. BUILD GENERATION CHART then looks up the arc's daughter category and the feature structure identifier as a source edge in the guide in box 1620. Box 1622 then checks whether the source edge already exists in the guide.

If the source edge does not exist in the guide then a source edge is created consisting of the daughter's category and the feature structure identifier and it is added to the guide and the agenda in box 1624. Once the source edge has been created then box 1626 then calls FIND ENTRIES IN LEXICON, described in further detail in FIG. 17, with the daughter's category and the feature structure identifier to see if there are any words in the grammar that are consistent with this information. When FIND ENTRIES IN LEXICON is finished the procedure returns to box 1628 and creates a requestor.

If the source edge does exist in the guide, the process goes from box 1622 directly t to box 1628 to create a requestor. Box 1628 creates a requestor consisting of the current edge and the arc. Once the requestor has been created then box 1630 calls ADD REQUESTOR TO INACTIVE EDGES, described in FIG. 4, with the requestor and the source edge's vertex. A vertex is a data structure that contains just the category and the feature structure identifier of an edge. It should be noted that in this instance, when ADD REQUESTOR TO INACTIVE EDGES, is called that box 408 in ADD REQUESTOR TO INACTIVE EDGES which calls COMBINE REQUESTOR AND INACTIVE EDGE should use the description of COMBINE REQUESTOR AND INACTIVE EDGE with respect to FIG. 18 and not the description with respect to FIG. 6 as used earlier.

The process then returns to box 1616 to check if there are further identifiers to process. If so the process proceeds to get the next feature structure identifier for the arc's daughter category, for each identifier and process as described above with the first identifier Alternate procedure FIND ENTRIES IN THE LEXICON shown in FIG. 17 is the same as procedure FIND ENTRIES IN THE LEXICON shown in FIG. 3 except that edges are distinguished by semantic facts as well as categories and feature structure identifiers. In FIG. 17, the procedure FIND ENTRIES IN LEXICON finds the entries in the lexicon that are consistent with the semantic facts, categories and feature structure identifier received as parameters in box 1702. Box 1704 then enumerates the lexical entries that are consistent with the categories, semantic facts and the constraints associated with the feature structure identifier and adds a new edge to the chart and the agenda. When the new edge is added box 1706 returns from the procedure.

Alternate procedure COMBINE A REQUESTOR AND AN INACTIVE EDGE is shown in FIG. 18. The procedure combines a requestor and an inactive edge to produce a new edge. After entry into the procedure in box 1800, the process moves to box 1802, which receives the requestor and the inactive edge. After receiving the requestor and the inactive edge box 1804 checks whether any two of the semantic facts of the requestor's edge, the inactive edge, and the arc constraints overlap. If the semantic facts overlap then the procedure returns in box 1822.

If the semantic facts do not overlap then the procedure proceeds to union the semantic facts together in box 1806. After the union is completed the process moves to box 1808 which extends the requestor's edge by its arc and looks up the resulting category and the feature structure identifier of the requestor's edge in the generation guide. This produces the corresponding edge in the guide. After producing the edge in the guide, the process moves to box 1810 which checks whether any of the local facts of this guide edge are missing from the unioned semantic facts. If any of the local facts are missing, then the new edge would always produce an incomplete solution and the process returns in box 1822.

If none of the local facts are missing, the procedure creates a subtree made up of the requestor's edge, the inactive edge, and the requestor's arc in box 1812. After creating the subtree the process moves to box 1814 which extends the requestor's edge by its arc and looks up the resulting category, the feature structure identifier of the requestor's edge, and the unioned semantic facts up in the generation chart. After looking up the resulting category, the feature structure identifier of the requestor's edge, and the unioned semantic facts up in the generation chart, box 1816 checks whether an edge with these properties exists in the generation chart. If the edge exist in the generation chart, process moves to box 1820, which adds the subtree to the edge. If the edge does not exist, the process moves to box 1818, which creates a new edge with these properties and add it to the chart and the agenda. When the new edge is created, the process moves to box 1820, which adds the subtree to the edge. After adding the subtree to the edge, the process returns in box 1822.

The invention claimed is:

1. A computer controlled method for constructing a generation chart having a plurality of chart edges comprising steps of:

a) receiving a grammar and one or more facts into a memory wherein the grammar contains category information and wherein each of the one or more facts contains at least one identifier;

b) constructing a generation guide in the memory having a plurality of guide edges wherein at least one of the plurality of guide edges is indexed by the category information and at least one identifier, and has an associated set of facts;

c) detecting a set of internal facts in the memory for at least one of the plurality of guide edges wherein the set of internal facts is a subset of the associated set of facts; and d) selecting the plurality of chart edges from the memory responsive to the set of internal facts of the plurality of guide edges; and e) generating strings of words based on the selected plurality of chart edges.

2. The computer controlled method of claim 1 further comprising constructing a generation chart from the plurality of selected chart edges.

3. The computer controlled method of claim 1 wherein at least one of the plurality of chart edges corresponds to a guide edge from the plurality of guide edges and a chart edge is selected only Wit contains all of the set of internal facts of its corresponding guide edge.

4. The computer controlled method of claim 3 wherein the corresponding chart edge and guide edge each have the same category information and at least one identifier is the same.

5. The computer controlled method of claim 3 wherein the corresponding chart edge and guide edge each have the same category information and semantic identifiers.

6. The computer controlled method of claim 3 wherein the step of detecting a set of internal facts for a given guide edge comprises selecting a fact from the associated set of facts as an internal fact if the fact is obligatory to the given guide edge.

7. The computer controlled method of claim 3 wherein the step of detecting a set of internal facts for a given guide edge comprises:

a) determining a first subset of the associated set of facts containing external facts; and b) selecting a second subset of the associated set of facts a subset which contains the facts not determined to be external facts as the set of internal facts.

8. The computer controlled method of claim 3 wherein the step of detecting a set of internal facts for a given guide edge comprises:

a) determining a first subset of the associated set of facts containing external facts; and b) removing the first subset from the associated set of facts to create a second subset of the associated set of facts as the set of internal facts.

9. The computer controlled method of claim 3 wherein the step of detecting a set of internal facts for a given guide edge comprises:

a) determining a first subset of the associated set of facts containing external facts:

b) selecting a second subset of the associated set of facts containing the facts not determined to be external facts;

c) selecting a third subset of the associated set of facts containing the facts obligatory to the given guide edge; and d) constructing the union of the second subset and the third subset to form the set of internal facts.

10. The computer controlled method of claim 3 wherein the step of detecting a set of internal facts for at least one of the plurality of guide edges comprises selecting a given fact as an internal fact if the given fact is dependent on an obligatory parent fact of the given fact, and the obligatory parent fact is obligatory on a daughter of the guide edge, and the obligatory parent fact is optional on the guide edge.

11. The computer controlled method of claim 10 wherein a fact is an obligatory parent fact of a given fact if the fact is associated with every parent path of every edge in which the given fact occurs.

12. A computer controlled method for constructing a generation chart having a plurality of chart edges comprising the steps of:

a) receiving a grammar and one or more facts into a memory wherein the grammar contains category information and each of the one or more facts contains at least one identifier;

b) constructing a generation guide having plurality of guide edges in the memory, wherein at least one guide edge has at least one fact associated therewith;

c) determining which facts in the memory are an obligatory parent fact for at least one fact to form a set of obligatory parent facts;

d) selecting a given fact in the memory as an internal fact to form a set of internal facts if the given fact is dependent on an obligatory parent fact of the given fact, and the obligatory parent fact is obligatory on a daughter of the guide edge, and the obligatory parent fact is optional on the guide edge;

e) selecting the plurality of chart edges from the memory responsive to the set of internal facts; and f) generating strings of words based on selected plurality of chart edges.

13. The computer controlled method of claim 12 further comprising constructing a generation chart from the plurality of selected chart edges.

14. An apparatus having a central processing unit (CPU) and a memory coupled to said CPU for constructing a generation chart having a plurality of chart edges comprising:

a) an input module configured to receive a grammar and one or more facts wherein the grammar contains category information and wherein each of the one or more facts contains at least one identifier;

b) a guide generator responsive to the input module configured to construct a generation guide having a plurality of guide edges wherein at least one of the plurality of guide edges is indexed by the category information and at least one identifier, and has an associated set of facts;

c) a detector responsive to the guide generator configured to detect a set of internal facts for at least one of the plurality of guide edges wherein the set of internal facts is a subset of the associated set of facts;

d) an edge selector responsive to the detector configured to select the plurality of chart edges responsive to the set of internal facts of the plurality of guide edges and generating strings words based on the selected plurality of chart edges.

15. The apparatus of claim 14 farther comprising a chart generator for constructing a generation chart from the plurality of selected chart edges.

16. The apparatus of claim 14 wherein at least one of the plurality of chart edges corresponds to a guide edge from the plurality of guide edges and a chart edge is selected only if a contains all of the set of internal facts of its corresponding guide edge.

17. The apparatus of claim 16 wherein the corresponding chart edge and guide edge each have the same category information and at least one identifier is the same.

18. The apparatus of claim 16 wherein the corresponding chart edge and guide edge each have the same category information and semantic identifiers.

19. The apparatus of claim 16 wherein the detector comprises a fact selector for selecting a fact from the associated set of facts as an internal fact if the fact is obligatory to the given guide edge.

20. The apparatus of claim 16 wherein the detector comprises:

a) an external fact selector for selecting a first subset of the associated set of facts containing external facts; and b) an internal fact selector for selecting a second subset of the associated set of facts which contains the facts not determined to be external facts as the set of internal facts.

21. The apparatus of claim 16 wherein the detector comprises:

a) an external fact selector for selecting a first subset of the associated set of facts containing external facts; and b) an internal fact selector for removing the first subset from the associated set of facts to create a second subset of the associated set of facts as the set of internal facts.

22. The apparatus of claim 16 wherein the detector comprises:

a) an external fact selector for determining a first subset of the associated set of facts containing external facts and selecting a second subset of the associated set of facts containing the facts not determined to be external facts;

c) an obligatory fact selector for selecting a third subset of the associated set of facts containing the facts obligatory to the given guide edge; and d) an internal fact selector for constructing the union of the second subset and the third subset to form the set of internal facts.

23. The apparatus of claim 16 wherein the detector comprises a selector for selecting a given fact as an internal fact if the given fact is dependent on an obligatory parent fact of the given fact, and the obligatory parent fact is obligatory on a daughter of the guide edge, and the obligatory parent fact is optional on the guide edge.

24. The apparatus of claim 23 wherein a fact is an obligatory parent fact of a given fact if the fact is associated with every parent path of every edge in which the given fact occurs.

25. An apparatus having a central processing unit (CPU) and a memory coupled to said CPU for constructing a generation chart having a plurality of chart edges comprising:

a) an input module for receiving a grammar and one or more facts wherein the grammar contains category information and each of the one or more facts contains at least one identifier;

b) a guide generator responsive to the input module for constructing a generation guide having plurality of guide edges, wherein at least one guide edge has at least one fact associated therewith;

c) a detector responsive to the guide generator for determining which facts are an obligatory parent fact for at least one guide edge to form a set of obligatory parent facts;

d) a fact selector responsive to the detector for selecting facts as an internal fact for at least one one of the plurality of chart edges from the set of obligatory parent facts for at least one guide edge to form a set of internal facts;

e) a chart edge selector responsive to the fact selector for selecting the plurality of chart edges responsive to the set of internal facts and generating strings of words based on the selected plurality of chart edges.

26. The apparatus of claim 25 further comprising a chart generator for constructing a generation chart from the plurality of selected chart edges.

27. A computer program product in a computer readable storage medium having computer readable code embodied therein for causing a computer to construct a generation chart having a plurality of chart edges, the computer readable code comprising:

a) computer readable program code configured to cause the computer to effect an input module configured to receive a grammar and one or more facts wherein the grammar contains category information and wherein each of the one or more facts contains at least one identifier;

b) computer readable program code configured to cause the computer to effect a guide generator responsive to the input module configured to construct a generation guide having a plurality of guide edges wherein at least one of the plurality of guide edges is indexed by the category information and at least one identifier, and has an associated set of facts;

c) computer readable program code configured to cause the computer to effect a detector responsive to the guide generator configured to detect a set of internal facts for at least one of the plurality of guide edges wherein the set of internal facts is a subset of the associated set of facts; and d) computer readable program code configured to cause the computer to effect an edge selector responsive to the detector configured to select the plurality of chart edges responsive to the set of internal facts of the plurality of guide edges.

28. The computer program product of claim 27 further comprising computer readable program code configured to cause the computer to effect a chart generator for constructing a generation chart from the plurality of selected chart edges.

29. The computer program product of claim 27 wherein at least one of the plurality of chart edges corresponds to a guide edge from the plurality of guide edges and a chart edge is selected only if it contains all of the set of internal facts of its corresponding guide edge.

30. The computer program product of claim 29 wherein the corresponding chart edge and guide edge each have the same category information and at least one identifier is the same.

31. The computer program product of claim 29 wherein the corresponding chart edge and guide edge each have the same category information and semantic identifiers.

32. The computer program product of claim 29 wherein the computer readable program code configured to cause the computer to effect a detector comprises a fact selector for selecting a fact from the associated set of facts as an internal fact if the fact is obligatory to the given guide edge.

33. The computer program product of claim 29 wherein the computer readable program code configured to cause the computer to effect a detector comprises:

a) computer readable program code configured to cause the computer to effect an external fact selector for selecting a first subset of the associated set of facts containing external facts; and b) computer readable program code configured to cause the computer to effect an internal fact selector for selecting a second subset of the associated set of facts which contains the facts not determined to be external facts as the set of internal facts.

34. The computer program product of claim 29 wherein the computer readable program code configured to cause the computer to effect detector comprises:

a) computer readable program code configured to cause the computer to effect an external fact selector for selecting a first subset of the associated set of facts containing external facts; and b) computer readable program code configured to cause the computer to effect an internal fact selector for removing the first subset from the associated set of facts to create a second subset of the associated set of facts as the set of internal facts.

35. The computer program product of claim 29 wherein the computer readable program code configured to cause the computer to effect detector comprises:

a) computer readable program code configured to cause the computer to effect an external fact selector for determining a first subset of the associated set of facts containing external facts and selecting a second subset of the associated set of facts containing the facts not determined to be external facts;

c) computer readable program code configured to cause the computer to effect an obligatory fact selector for selecting a third subset of the associated set of facts containing the facts obligatory to the given guide edge; and d) computer readable program code configured to cause the computer to effect an internal fact selector for constructing the union of the second subset and the third subset to form the set of internal facts.

36. The computer program product of claim 29 wherein the computer readable program code configured to cause the computer to effect detector comprises computer readable program code configured to cause the computer to effect a selector for selecting a given fact as an internal fact if the given fact is dependent on an obligatory parent fact of the given fact, and the obligatory parent fact is obligatory on a daughter of the guide edge, and the obligatory parent fact is optional on the guide edge.

37. The computer program product of claim 36 wherein a fact is an obligatory parent fact of a given fact if the fact is associated with every parent path of every edge in which the given fact occurs.

38. A computer program product in a computer readable storage medium having computer readable program code embodied therein for causing a computer to construct a generation chart having a plurality of chart edges comprising:

a) computer readable program code configured to cause the computer to effect an input module for receiving a grammar and one or more facts wherein the grammar contains category information and each of the one or more facts contains at least one identifier;

b) computer readable program code configured to cause the computer to effect a guide generator responsive to the input module for constructing a generation guide having plurality of guide edges, wherein at least one guide edge bas at least one fact associated therewith;

c) computer readable program code configured to cause the computer to effect a detector responsive to the guide generator for determining which facts are an obligatory parent fact for at least one guide edge to form a set of obligatory parent facts;

d) computer readable program code configured to cause the computer to effect a fact selector responsive to the detector for selecting facts as an internal fact for at least one one of the plurality of chart edges from the set of obligatory parent facts for at least one guide edge to form a set of internal facts;

e) computer readable program code configured to cause the computer to effect a chart edge selector responsive to the fact selector for selecting the plurality of chart edges responsive to the set of internal facts.

39. The computer program product of claim 38 further comprising computer readable program code configured to cause the computer to effect a chart generator for constructing a generation chart from the plurality of selected chart edges.

40. An article of manufacture for constructing a generation chart having a plurality of chart edges, the article of manufacture comprising computer readable media including computer readable instructions embedded therein that causes a computer to perform a method, wherein the method comprises:

a) receiving a grammar and one or more facts into a memory wherein the grammar contains category information and wherein each of the one or more facts contains at least one identifier;

b) constructing a generation guide in the memory having a plurality of guide edges wherein at least one of the plurality of guide edges is indexed by the category information and at least one identifier, and has an associated set of facts;

c) detecting a set of internal facts in the memory for at least one of the plurality of guide edges wherein the set of internal facts is a subset of the associated set of facts; and d) selecting the plurality of chart edges from the memory responsive to the set of internal facts of the plurality of guide edges.

41. The article of claim 40 further comprising the step of: constructing a generation chart from the plurality of selected chart edges.

* * * * *

UNITED STATES PATENT AND TRADEMARK OFFICE

CERTIFICATE OF CORRECTION

PATENT NO. : 7,225,121 B2
APPLICATION NO. : 10/260652
DATED : May 29, 2007
INVENTOR(S) : Maxwell, III et al.

It is certified that error appears in the above-identified patent and that said Letters Patent is hereby corrected as shown below:

On the Title Page, should read Item (73) Assignee: Xerox Corporation,
Norwalk, CT (US)

Signed and Sealed this

Third Day of March, 2009

JOHN DOLL
*Acting Director of the United States Patent and Trademark Office*